US012563444B1

(12) United States Patent
Dharmadhikari et al.

(10) Patent No.: US 12,563,444 B1
(45) Date of Patent: Feb. 24, 2026

(54) SYSTEMS AND METHODS FOR ACCESS TRAFFIC STEERING, SWITCHING, AND SPLITTING WITH USER EQUIPMENT HAVING MULTIPLE IDENTITIES

(71) Applicant: Cable Television Laboratories, Inc., Lousiville, CO (US)

(72) Inventors: Omkar Dharmadhikari, Lakewood, CO (US); Ojas Choksi, Herndon, VA (US)

(73) Assignee: Cable Television Laboratories, Inc., Louisville, CO (US)

( * ) Notice: Subject to any disclaimer, the term of this patent is extended or adjusted under 35 U.S.C. 154(b) by 944 days.

(21) Appl. No.: 17/653,640

(22) Filed: Mar. 4, 2022

Related U.S. Application Data

(60) Provisional application No. 63/307,886, filed on Feb. 8, 2022, provisional application No. 63/220,621, filed
(Continued)

(51) Int. Cl.
$H04W\ 28/082$      (2023.01)
$H04W\ 8/22$      (2009.01)
(Continued)

(52) U.S. Cl.
CPC ........... *H04W 28/082* (2023.05); *H04W 8/22* (2013.01); *H04W 28/0215* (2013.01); *H04W 28/0925* (2020.05)

(58) Field of Classification Search
CPC . H04W 28/082; H04W 28/0925; H04W 8/22; H04W 28/0215
See application file for complete search history.

(56) References Cited

U.S. PATENT DOCUMENTS

| | | | |
|---|---|---|---|
| 2013/0225123 A1* | 8/2013 | Adjakple | G06Q 20/322 |
| | | | 455/406 |
| 2015/0105075 A1* | 4/2015 | Yu | H04L 67/303 |
| | | | 455/435.2 |

(Continued)

FOREIGN PATENT DOCUMENTS

| | | | | |
|---|---|---|---|---|
| EA | 016185 B1 * | 3/2012 | | A61P 3/10 |
| EP | 3768032 A1 * | 1/2021 | | H04W 12/06 |

(Continued)

*Primary Examiner* — Mehmood B. Khan
(74) *Attorney, Agent, or Firm* — PdZ Patent Law, PLLC

(57) ABSTRACT

A method operable with a first communication network for supporting a user equipment (UE) device having at least a first identity associated with the first communication network and a second identity associated with a second communication network. The method includes (a) exchanging data with the UE device via a first access communication link, the first access communication link being an access communication link of the first communication network, (b) exchanging data with the UE device via a second access communication link and an interface between the first and second communication networks, the second access communication link being an access communication link of the second communication network, (c) performing access traffic steering, switching, and splitting (ATSSS) across at least the first and second communication links, at least partially using a proxy server associated with the first communication network.

17 Claims, 22 Drawing Sheets

Related U.S. Application Data on Jul. 12, 2021, provisional application No. 63/156,624, filed on Mar. 4, 2021.

(51) Int. Cl.
  *H04W 28/02*     (2009.01)
  *H04W 28/08*     (2023.01)

(56)            References Cited

U.S. PATENT DOCUMENTS

| | | | | |
|---|---|---|---|---|
| 2018/0331944 A1* | 11/2018 | Salkintzis | ............... | H04L 45/24 |
| 2020/0128432 A1* | 4/2020 | Youn | ................ | H04W 28/0268 |
| 2020/0128471 A1* | 4/2020 | Liu | .................... | H04W 28/0268 |
| 2021/0084713 A1* | 3/2021 | Miklós | .................. | H04W 76/12 |
| 2021/0099968 A1* | 4/2021 | Tiwari | ............... | H04W 60/005 |
| 2021/0368373 A1* | 11/2021 | Youn | .................... | H04W 76/16 |
| 2022/0053448 A1* | 2/2022 | Velev | .................... | H04W 76/27 |
| 2022/0132299 A1* | 4/2022 | Bhowmik | ............. | H04W 76/10 |
| 2022/0240222 A1* | 7/2022 | Youn | .................. | H04W 60/005 |
| 2023/0056442 A1* | 2/2023 | Ly | ......................... | H04W 24/04 |
| 2023/0093965 A1* | 3/2023 | Velev | ................... | H04W 68/12 |
| | | | | 455/458 |
| 2024/0259932 A1* | 8/2024 | Ianev | .................... | H04W 48/16 |

FOREIGN PATENT DOCUMENTS

| | | | | |
|---|---|---|---|---|
| EP | 3937469 A1 * | 1/2022 | ............ | H04L 69/18 |
| WO | WO-2021155090 A1 * | 8/2021 | ............ | H04W 24/10 |
| WO | WO-2022268478 A1 * | 12/2022 | ............ | H04W 76/19 |

* cited by examiner

Inside H-MVNO Coverage

Outside H-MVNO Coverage

SYSTEMS AND METHODS FOR ACCESS TRAFFIC STEERING, SWITCHING, AND SPLITTING WITH USER EQUIPMENT HAVING MULTIPLE IDENTITIES

CROSS REFERENCE TO RELATED APPLICATIONS

This application claims the benefit of priority to each of (a) U.S. Provisional Patent Application Ser. No. 63/156,624, filed on Mar. 4, 2021, (b) U.S. Provisional Patent Application Ser. No. 63/220,621, filed on Jul. 12, 2021, and (c) U.S. Provisional Patent Application Ser. No. 63/307,886, filed on Feb. 8, 2022. Each of the aforesaid patent applications is incorporated herein by reference.

BACKGROUND

Many multiple system operators (MSOs) have a mobile virtual network operator (MVNO) relationship with one or more mobile network operators (MNOs) to offer cellular services as part of their bundled service offerings along with cable television, landline telephone, and broadband Internet service offerings. Recent availability of shared spectrum has significantly reduced the barrier to entering the cellular service space, and many MSOs are therefore now looking to deploy their own cellular infrastructure (including an access network and a core network) to improve economics of MVNO agreements by minimizing time spent on MNO networks.

Dual Subscriber Identity Module (SIM) capable user equipment (UE) implementing Dual SIM Dual Standby (DSDS) technology enables MSOs to leverage their own cellular infrastructure when available (using an MSO SIM), while allowing the MSOs to leverage a largely ubiquitous coverage footprint of MNOs through MVNO relationships (using an MNO SIM) outside of MSO cellular coverage areas. As such, DSDS technology allows MSOs to leverage existing Reseller MVNO agreements while minimizing time spent on MNO networks. A MVNO communication system including cellular infrastructure owned by an MSO, as well as cellular infrastructure owned by a MNO, may be referred to as a hybrid mobile virtual network operator (H-MVNO) communication system.

DETAILED DESCRIPTION OF THE EMBODIMENTS

Figure 1:
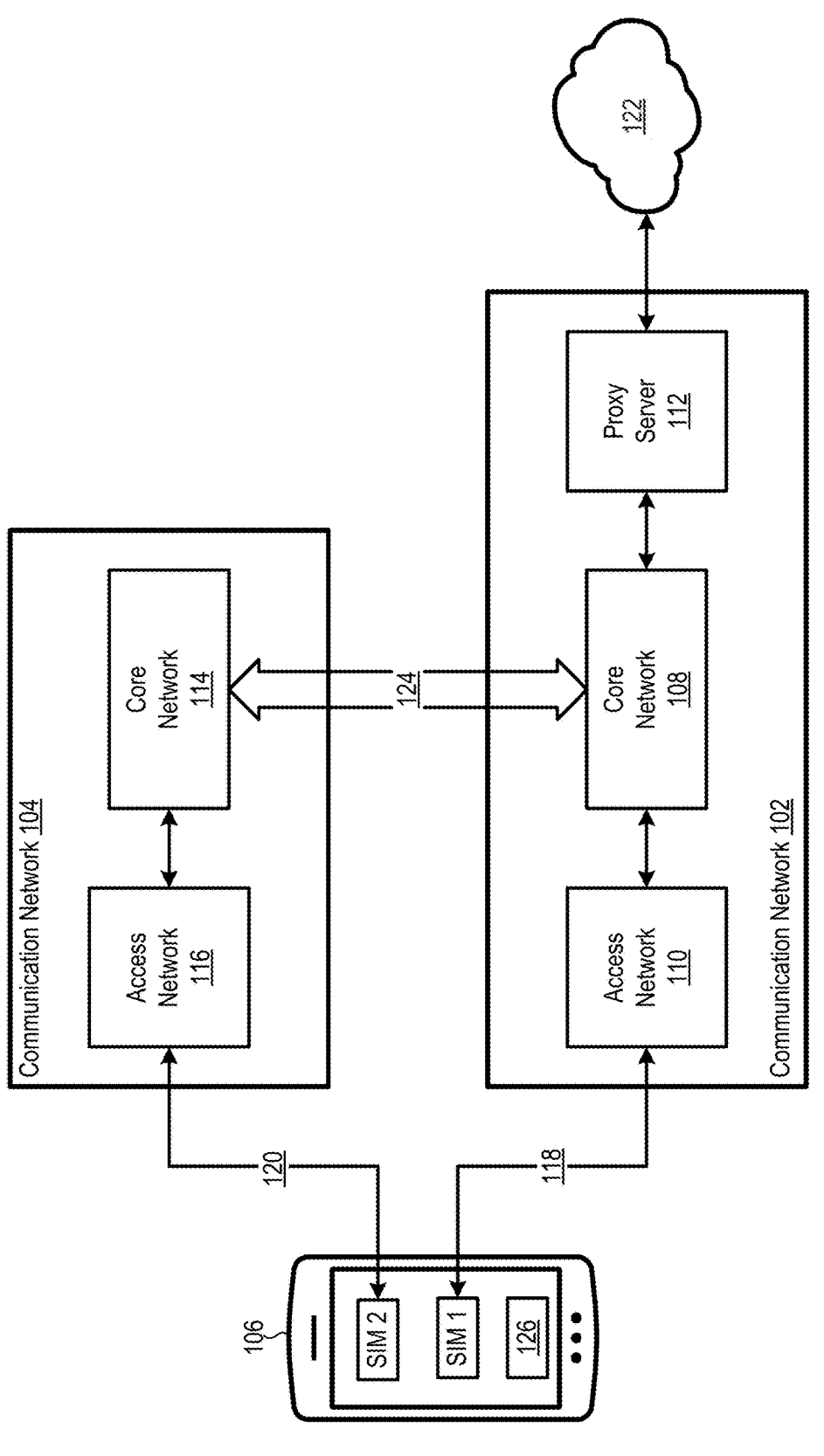
FIG. 1 is a block diagram of a communication system supporting user equipment having multiple identities that is configured to perform access traffic steering, switching, and splitting (ATSSS), according to an embodiment.

In a conventional Reseller hybrid mobile virtual network operator (H-MVNO) system leveraging Dual SIM Dual Standby (DSDS) technology, the mobile network operator (MNO) and the multiple system operator (MSO) each maintain independent core networks and subscriptions. Consequently, there are two separate anchor points for subscriber data sessions in conventional H-MVNO communication systems, i.e., one anchor point in the MSO core network and another anchor point in the MNO core network. Each anchor point independently manages user equipment (UE) and subscriber policies and subscriptions, and treatment of subscriber data sessions may therefore vary depending on which anchor point a given data session is anchored to. Consequently, the MSO lacks visibility into subscriber usage patterns, as well as control over subscription and policy management, in a conventional H-MVNO system.

The aforementioned problems can be at least substantially eliminated by modifying a conventional H-MVNO system to use a single anchor point in the MSO's core network for all data sessions with UE, irrespective of whether a data session is traversing an access communication link of the MNO or an access communication link of the MSO. With this modified H-MVNO system architecture, a data session supported by an access communication link of the MNO bypasses some elements of the MNO's core network and flows through a roaming interface to the MSO's core network. As such, the MSO has insight to data sessions traversing the MNO's network, and the MSO can unify and dynamically update policies and subscriptions and create service bundles, such as to customize experience and services offerings on a per subscriber/subscriber group basis.

However, problems remain even with the aforementioned modified H-MVNO communication system architecture. For example, there is limited flexibility in steering data traffic across the MSO and MNO networks. Additionally, there may be a perceptible discontinuity in service as a UE device transitions from one of the two networks to the other of the two networks, due to different respective Internet Protocol (IP) addresses being allocated to the UE device by each of the MSO and MNO networks.

Disclosed herein are systems and methods for access traffic steering, switching, and splitting (ATSSS) with UE having multiple identities, which at least partially overcome the above discussed problems. Certain embodiments of the new systems and methods leverage a common anchor point for communication links of multiple access communication networks to implement a proxy server which performs ATSSS across the multiple communication links, even when the communication links are associated with different respective UE device identities. Other embodiments of the new systems and methods leverage a common anchor point for communication links of multiple access communication networks to assign a common IP address to each identity of a given UE device, thereby enabling performance of ATSSS across the multiple communication link, even when the communication links are associated with different respective UE device identities. As such, these embodiments enable significant flexibility in steering, switching, and splitting of data that is not feasible with convention H-MVNO system architectures. Additionally, particular embodiments reduce, or even essentially eliminate, perceptible discontinuity in service as a UE device transitions between communication networks. In this document, "ATSSS" refers to steering, switching, and/or splitting data across two or more access networks.

FIG. 1 is a block diagram of a communication system 100, which is one embodiment of the new systems disclosed herein configured to perform ATSSS with UE having multiple identities. Communication system 100 includes a communication network 102, a communication network 104, and a UE device 106. In some embodiments, communication network 102 is an MSO communication network and communication network 104 is an MNO communication network, such as to collectively form a H-MVNO communication system, although communication system 100 is not limited to being a H-MVNO communication system. For example, in some other embodiments, communication networks 102 and 104 are operated by a common party, instead of by different parties.

Communication network 102 includes a core network 108, an access network 110, and a proxy server 112. Additionally, communication network 104 includes a core network 114 and an access network 116. In this document, a "core network" is a central part of a communication network which offers services to subscribers connected to the communication network via an access network. Examples of core networks 108 and 114 include, but are not limited to, a $3^{rd}$ Generation Partnership Project (3GPP) cellular wireless core network (e.g., a fourth generation (4G) cellular wireless core network such as an evolved packet core (EPC), a fifth generation (5G) cellular wireless core network such as a 5GCN, or a sixth generation (6G) cellular wireless core network) and a satellite wireless core network.

In this document, an "access network" is a network that connects subscribers to a core network. Examples of an access network include, but are not limited to, a 3GPP cellular wireless access network (e.g., a 4G cellular wireless access network, a 5G cellular wireless access network, or a 6G wireless access network), a non-3GPP cellular wireless access network, a Wi-Fi wireless access network, a satellite wireless access network, a Bluetooth wireless access network, a long range (LoRa) wireless access network, a Zigbee wireless access network, and a wireline access network (e.g., a cable wireline access network (e.g., operating according to a data over cable service interface specification (DOCSIS) protocol), an optical wireline access network (e.g., operating according to a Ethernet passive optical network (EPON) protocol, a radio frequency over glass (RFOG or RFoG) protocol, or a Gigabit-capable passive optical network (GPON) protocol), a power line communication access network, and a digital subscriber line (DSL) access network).

UE device 106 has two identities, where the first identity is associated with communication network 102 and the second identity is associated with communication network 104. Specifically, a first identity of UE device 106 is established by a first SIM (SIM 1) of UE device 106, and the first identity is associated with communication network 102. Additionally, a second identity of UE device 106 is established by a second SIM (SIM 2) of UE device 106, and the second identity is associated with communication network 104. In certain embodiments, SIM 1 is authenticated by core network 108 and SIM 2 is authenticated by core network 114. In certain other embodiments, each of SIM 1 and SIM 2 is authenticated by a common core network, such as by core network 108. For example, in some embodiments where core networks 108 and 114 are 3GPP core networks, the two core networks share a common 3GPP S6 interface, which enables authenticating each of SIM 1 and SIM 2 by a common one of the two core networks. In some embodiments, SIMs 1 and 2 are physical SIM cards within UE device 106, while in some other embodiments, SIMs 1 and 2 are embedded SIMs (eSIMs) of UE device 106. In yet other embodiments, one of SIM 1 and SIM 2 is a physical SIM card, while the other of SIM 1 and SIM 2 is an eSIM. In particular alternate embodiments, one or more identities of a UE device 106 is established by something other than a SIM, such as by a security certificate.

The first and second identities of UE device 106 may be associated with different protocol stacks of UE device 106, so that each identity of UE device 106 logically appears as a separate UE device. In some embodiments, each of these two protocol stacks complies with an open systems interconnection (OSI) model, such that each protocol stack includes one or more of the following layers: (1) a physical layer, (2) a data link layer, (3) a network layer, (4) a transport layer, (5) a session layer, (6) a presentation layer, and (7) an application layer. Although UE device 106 is depicted as being a mobile telephone, UE device 106 could take other forms, including but not limited to a computer, a set-top device, a data storage device, an Internet of Things (IoT) device, an entertainment device, a computer networking device, a smartwatch, a wearable device with wireless capability, a medical device, a security device, a monitoring device, and a wireless access device (including, for example, an eNB, a gNB, a Wi-Fi-based wireless access point, an IAB access point, a microcell, a picocell, a femtocell, a macrocell, a Wi-Fi-based application, a satellite communication device, etc.). While FIG. 1 depicts only a single UE device being served by communication networks 102 and 104, particular embodiments of communication networks 102 and 104 are capable of simultaneously supporting a plurality of UE devices, such as tens, hundreds, thousands, or more, of UE devices.

UE device 106 is configured to communicate with each of communication networks 102 and 104 via a respective access communication link of each network. Specifically, UE device 106 is configured to exchange data with communication network 102 via an access communication link 118 of access network 110, and UE device 106 is configured to exchange data with communication network 104 via an access communication link 120 of access network 116. Each access communication link 118 and 120 may be either a wireless access communication link or a wireline access communication link, depending on the configuration of its respective access network.

Communication network 102 is communicatively coupled to external network resources 122 via proxy server 112. Proxy server 112 is discussed further below. External network resources 112 include, for example, one or more of the public Internet, a private network, a content server, a voice communication service, etc. Although not required, external network resources 122 are typically not part of communication system 100.

Core network 108 of communication network 102 serves as a single anchor point for data being transmitted between UE device 106 and external network resources 122. Accordingly, data associated with SIM 1 flows through communication network 102. Additionally, data associated with SIM 2 flows through communication network 102 via an interface 124 between communication networks 102 and 104. In some embodiments, interface 124 is an interface between core networks 108 and 114, as depicted in FIG. 1. Particular embodiments of interface 124 include one or more roaming interfaces, such as one or more 3GPP roaming interfaces, e.g., a 3GPP S5 interface, a 3GPPP S6a interface, a 3GPP S8 interface, a 3GPP N9 interface, a 3GPP N16 interface, a 3GPP N26 interface, and/or successors or modifications of aforesaid 3GPP roaming interfaces. It should be noted that while all data exchanged between UE device 106 and external network resources 122 flows through core network 108 of communication network 102, some embodiments of communication network 104 are configured to serve as an anchor point for voice telephone service, short message service (SMS), and/or other specialty services, in communication system 100.

Figure 2:
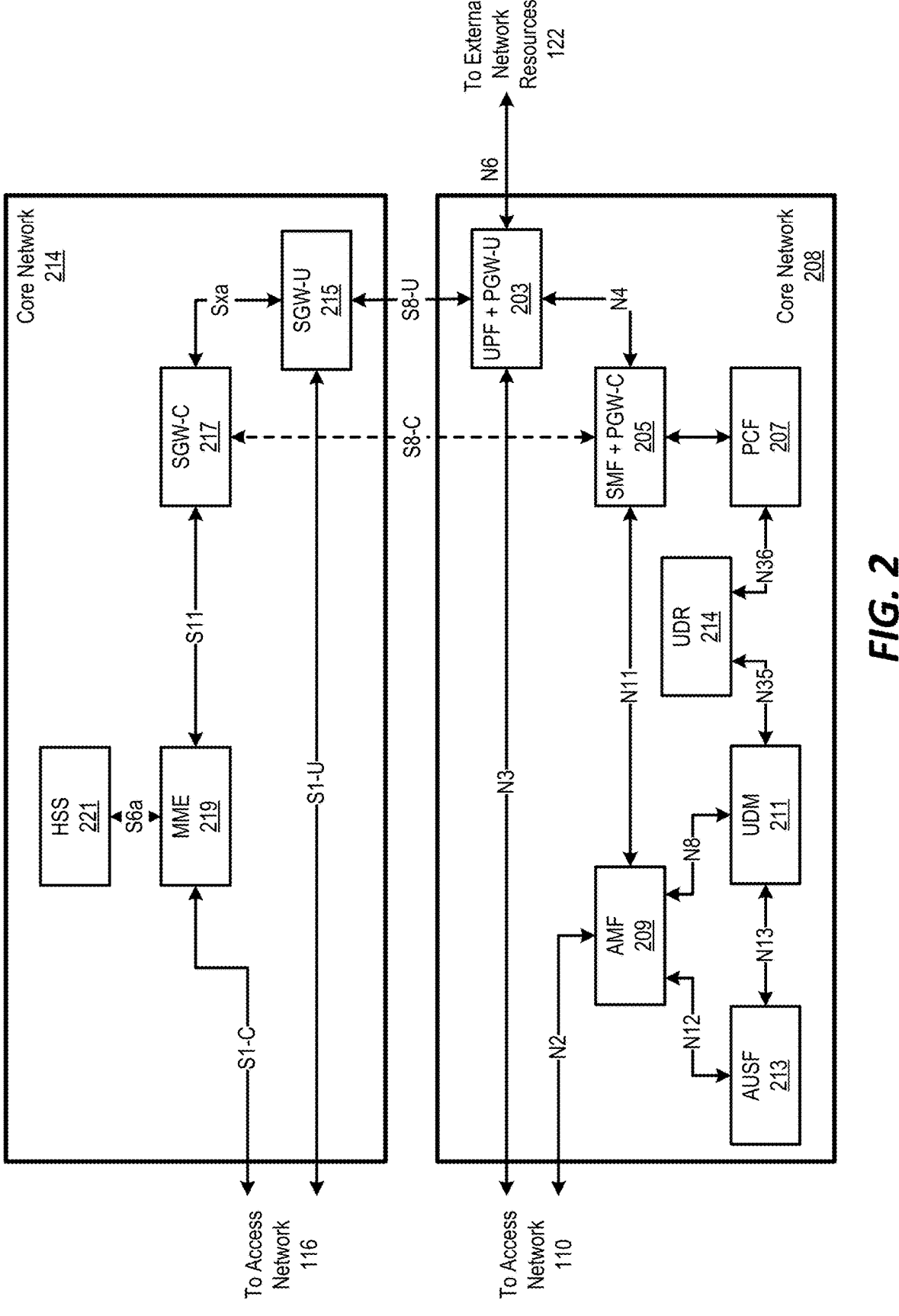
FIG. 2 is a block diagram illustrating one possible embodiment of core networks of the FIG. 1 communication system.
Figure 3:
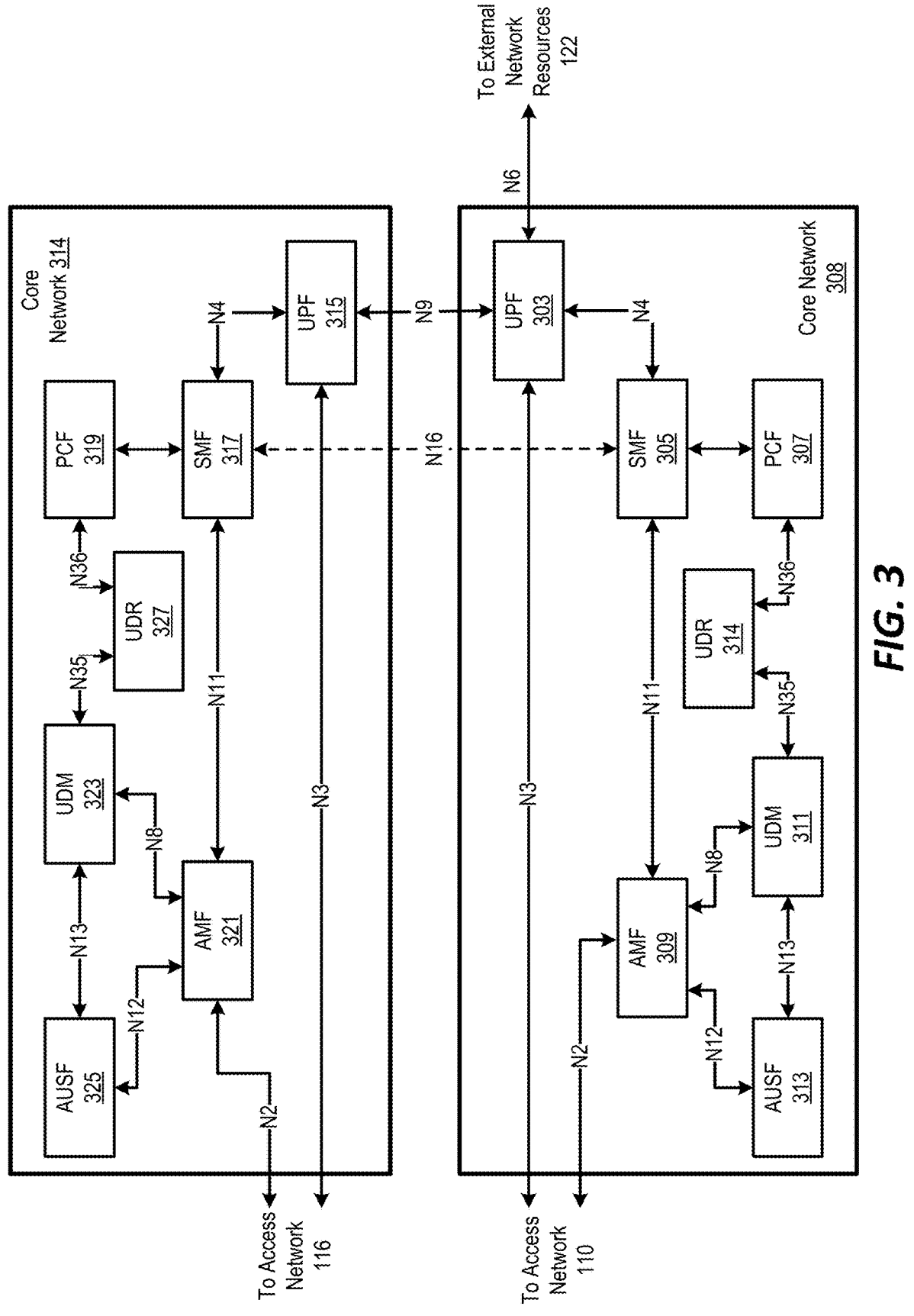
FIG. 3 is a block diagram illustrating another possible embodiment of core networks of the FIG. 1 communication system.

FIGS. 2 and 3 collectively illustrate two example embodiments of core networks 108 and 114. It is understood, however, that core networks 108 could have other configurations without departing from the scope hereof.

FIG. 2 is a block diagram of a core network 208 and a core network 214, which are example embodiments of core networks 108 and 114, respectively. The two core networks in FIG. 2 have different respective architectures. In particular, core network 208 is based on a 3GPP 5G mobile core network, while core network 214 is based on 3GPP 4G mobile core network. Core network 208 includes a User Plane Function (UPF) and an User Plane Function of Packet Gateway (PGW-U) 203, a Session Management Function (SMF) and a Control Plane Function of Packet Gateway (PGW-C) 205, a Policy Control Function (PCF) 207, an Access Management Mobility Function (AMF) 209, a Unified Data Management (UDM) 211, an Authentication Server Function (AUSF) 213, and an User Data Repository (UDR) 214. Core network 214, on the other hand, includes a User Plane Function of Serving Gateway (SGW-U) 215, a Control Plane Function of Serving Gateway (SGW-C) 217, a Mobility Management Entity (MME) 219, and a Home Subscriber Server (HSS) 221. UPF+PGW-U 203 and SGW-U 215 are linked by a 3GPP S8-U roaming interface, and SMF+PGW-C 205 and SGW-C 217 are linked by a 3GPP S8-C roaming interface. The S8-U and S8-C interfaces collectively form an embodiment of interface 124 of FIG. 1. The S8-U interface carries user plane data traffic that is routed from core network 214 to core network 208, and the S8-C interface carries control plane signaling messages to set up user plane resources between core networks 208 and 214.

FIG. 3 is a block diagram of a core network 308 and a core network 314, which are additional example embodiments of core networks 108 and 114, respectively. The two core networks in FIG. 3 have a common high-level architecture based on a 5GPP mobile core network. Core network 308 includes a UPF 303, a SMF 305, a PCF 307, an AMF 309, a UDM 311, an AUSF 313, and an UDR 314, and core network 314 includes UPF 315, a SMF 317, a PCF 319, an AMF 321, a UDM 323, an AUSF 325, and a UDR 327. UPF 303 and UPF 315 are linked by a 3GPPS N9 roaming interface, and SMF 305 and SMF 317 are linked by a 3GPP N16 roaming interface. The N9 and N16 interfaces collectively form an embodiment of interface 124 of FIG. 1.

Figure 4:
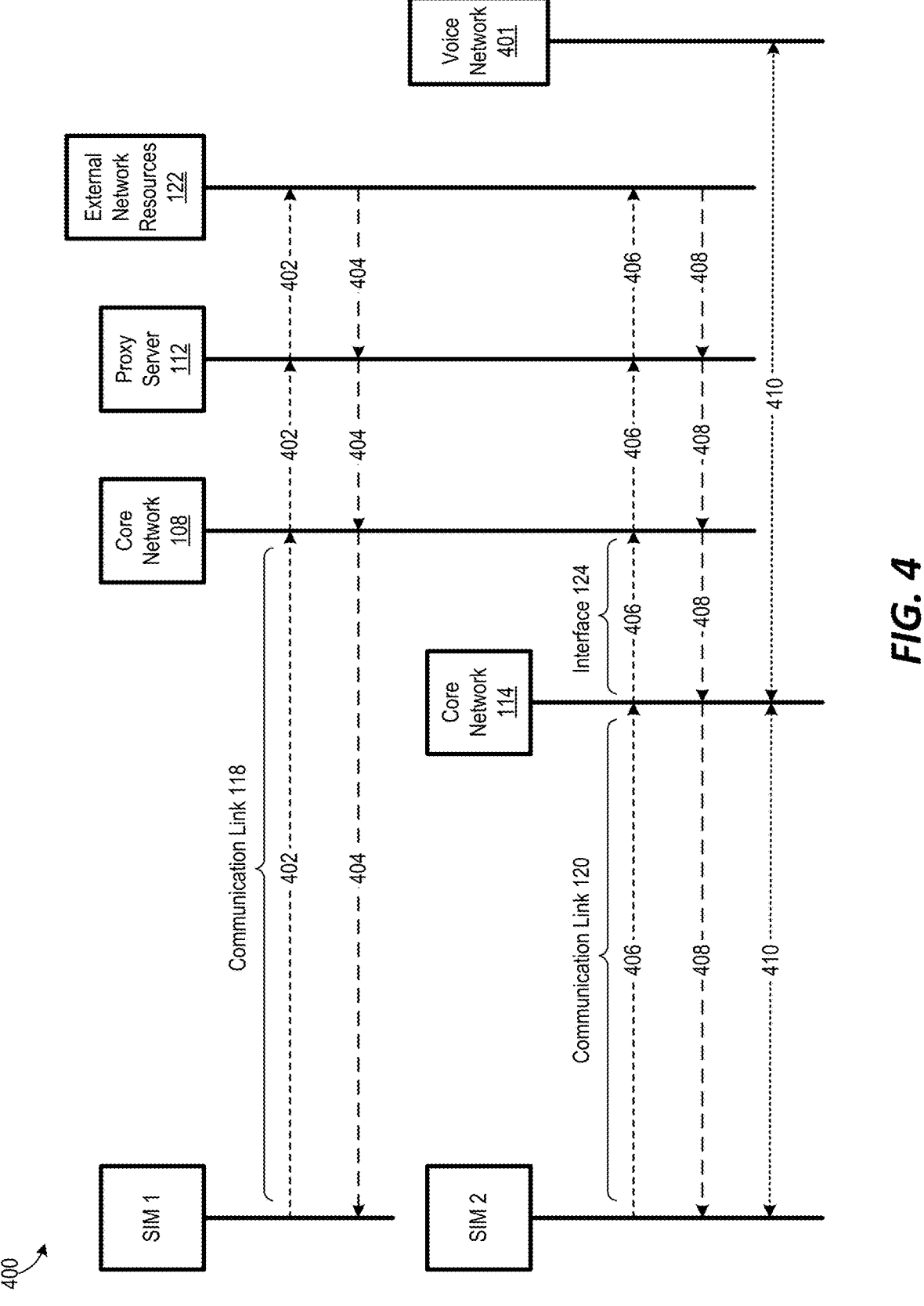
FIG. 4 is a data flow diagram illustrating one example of data flow in the FIG. 1 communication system, according to an embodiment.

FIG. 4 is a dataflow diagram 400 illustrating one example of how communication network 102 may serve as a single anchor point for data flowing between UE device 106 and external network resources 122. FIG. 4 includes vertical lines representing each of SIM 1 of UE device 106, SIM 2 of UE device 106, core network 108, proxy server 112, external network resources 122, core network 114, and a voice network 401 (e.g., for handling voice telephone calls and/or SMS). In this example, uplink data 402 associated with SIM 1 flows from UE device 106 to external network resources 122 as follows: (a) from UE device 106 to core network 108 via access communication link 118 of access network 110, (b) from core network 108 to proxy server 112, and (c) from proxy server 112 to external network resources 122. Downlink data 404 associated with SIM 1 flows from external network resources 112 to UE device 106 along the same path as uplink data 402, but in the opposite direction. Uplink data 406 associated SIM 2 flows from UE device 106 to external network resources 122 as follows: (a) from UE device 106 to core network 114 via access communication link 120 of access network 116, (b) from core network 114 to core network 108 via interface 124 between communication networks 102 and 104, (c) from core network 108 to proxy server 112, and (d) from proxy server 112 to external network resources 122. Downlink data 408 associated with SIM 2 flows from external network resources 122 to UE device 106 along the same path as uplink data 406, but in the opposite direction. Voice/SMS traffic 410 associated with UE device 106 flows between SIM 2 and voice network 401 via core network 114.

As illustrated in FIG. 4 example, all data flowing between UE device 106 and external network resources 122 flows through core network 108, irrespective of whether the data is associated with SIM 1 or SIM 2, such that core network 108 serves as a single anchor point for all data transmitted between UE device 106 and external network resources 122. Communication system 100 is advantageously configured to leverage this characteristic to perform ATSSS with multi-identity UE devices, e.g., with multi-SIM UE device UE 106, at least partially using proxy server 112.

In particular, proxy server 112 serves as a single logical interface between (a) external network resources 112 and (b) each of SIM 1 and SIM 2 of UE device 106. As such, all data flowing between UE device 106 and external network resources 122 logically flows through proxy server 112, irrespective of whether the data is being handled by access network 110 or access network 116. Proxy server 112 performs ATSSS of data flowing between external network resources 122 and UE device 106, even though UE device 106 has multiple identities. For example, some embodiments of proxy server 112 are configured to link packet data unit (PDU) sessions across access communication links 118 and 120. Accordingly, proxy server 112 is configured, such as by being provided with policies by a SMF+PPGW+C, to steer, switch, and split data flowing between UE device 106 and external resources 122 among access communication links 118 and 120. In particular embodiments, proxy server 112 is a Multipath Transmission Control Protocol (MP-TCP) proxy server, and each of SIM 1 and SIM 2 is assigned a different IP address by core network 102 and core network 104, respectively.

FIG. 1 illustrates proxy server 112 as being a standalone element within communication network 102. However, in some embodiments, proxy server 112 is integrated within core network 108. For example, in certain embodiments where core network 108 includes a 3GPP cellular wireless core network, proxy server 112 is integrated in a Packet Network Data Gateway (PGW) and a User Plane Function (UPF) of the cellular wireless core network. In some alternate embodiments of communication system 100, proxy server 112 is external to communication network 102 and is logically coupled between core network 108 and external network resources 122.

Proxy server 112 is optionally configured to cooperate with an ATSSS client 126 of UE device 106 when performing ATSSS. ATSSS client 126 is configured, for example, to perform ATSSS activities within UE device 106. In some embodiments, such as illustrated in FIG. 1, ATSSS client 126 is a standalone client within UE device 106. In some alternate embodiments, ATSSS client 126 is integrated with one or more other elements of UE device 106, such as with an operating system of UE device 106. While ATSSS of communication system 100 is discussed below solely with respect to proxy server 112 for simplicity, it is understood that proxy server 112 may work with ATSSS client 126 when performing any or all of the ATSSS discussed below. In particular embodiments, core network 108 is configured to create ATSSS polices and rules spanning the multiple identities of UE device 106, and core network 108 is configured to cooperate with ATSSS client 126 to enforce these policies and rules.

In certain embodiments, proxy server 112 is configured to perform ATSSS based on one or more of (a) a subscription type associated with UE device 106 and/or a user of UE device 106, (b) operating policies of communication system 100, (c) operating conditions of communication system 100, e.g., current data traffic load on each of communication networks 102 and 104, (d) capabilities of UE device 106, and (e) analytics of communication system 100.

Figure 5:
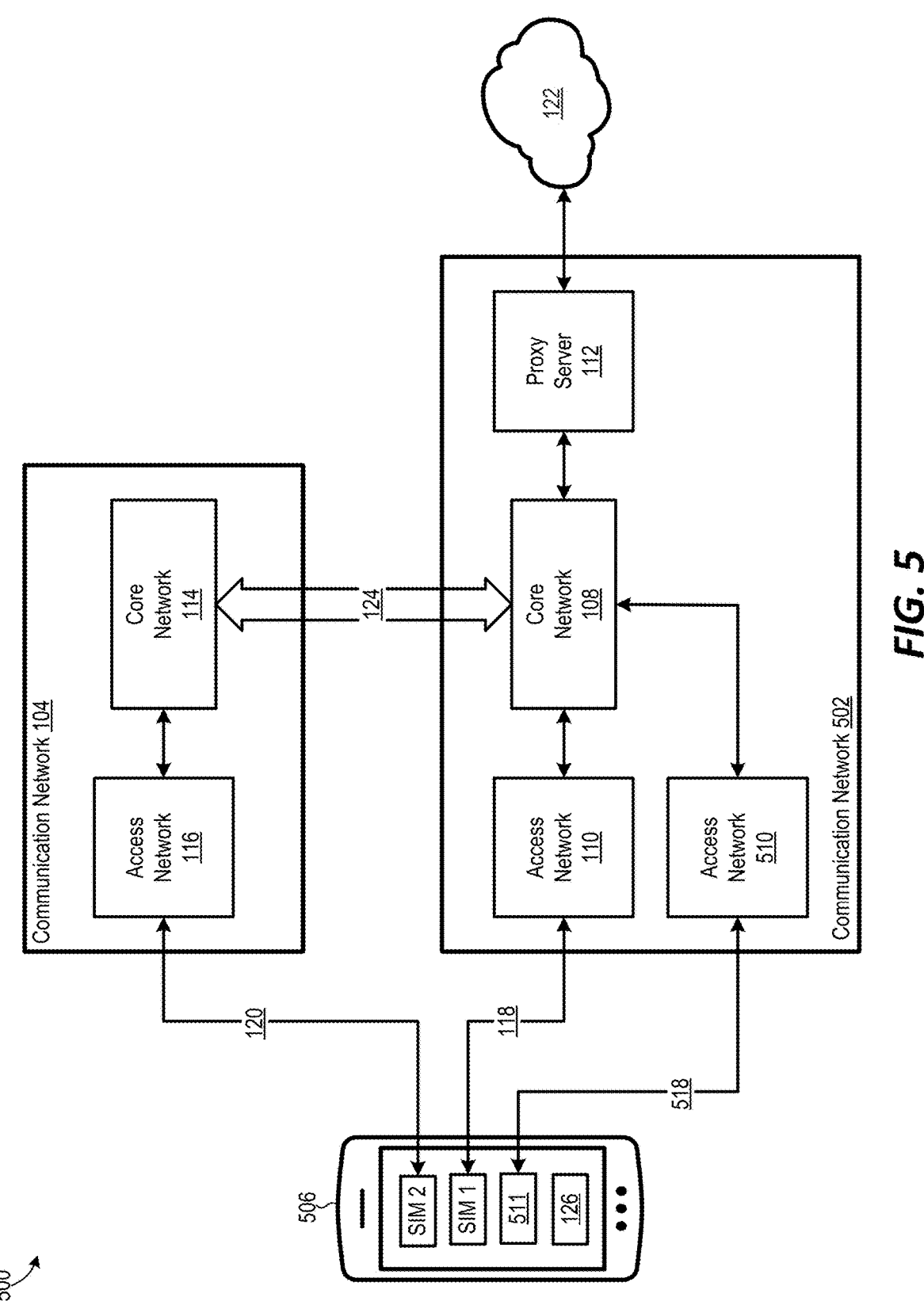
FIG. 5 is a block diagram of an alternate embodiment of the FIG. 1 communication system including an additional access communication network.

Communication network 100 could be modified so that proxy server 112 performs ATSSS across three or more access communication links. For example, FIG. 5 is a block diagram of a communication system 500, which is an alternate embodiment of communication system 100 where (a) communication network 102 is replaced with communication network 502, and (b) UE device 106 is a replaced with a UE device 506. Communication network 502 is like communication network 102 but further including an access network 510 configured to connect subscribers to core network 108. In certain embodiments, access network 110 and access network 510 are different types of access networks. For example, in particular embodiments, access network 110 is a 3GPP cellular wireless access network and access network 510 is either a Wi-Fi wireless access network, a satellite wireless access network, or a wireline access network.

UE device 506 is like UE device 106 but UE device 506 has a third identity established by a security certificate 511, in addition to the first and second identities established by SIM 1 and SIM 2, respectively. In some embodiments, each of the first identity (established by SIM 1), the second identity (established by SIM 2), and the third identity (established by security certificate 511) is associated with a different respective protocol stack and is assigned a different IP address. Each of the third identity and the first identity are associated with communication network 502, while the second identity is associated with communication network 104. UE device 506 is configured to communicate with communication network 502 via a communication link 518 of access network 510, as well as via communication link 118 of access network 110. UE device 506 is also configured to communicate with communication network 502 via access communication link 120 of access communication network 116 and interface 124. Proxy server 112 in FIG. 5 is configured to perform ATSSS in the same manner as discussed above with respect to FIG. 1 except that proxy server 112 is further configured to perform ATSSS across three access communication links, i.e., across access communication links 118, 120, and 318, in FIG. 5.

Discussed below with respect to FIGS. 6-9 are several example embodiments of communication systems 100 and 500. It is understood, though that communication systems 100 and 500 are not limited to these example embodiments.

Figure 6:
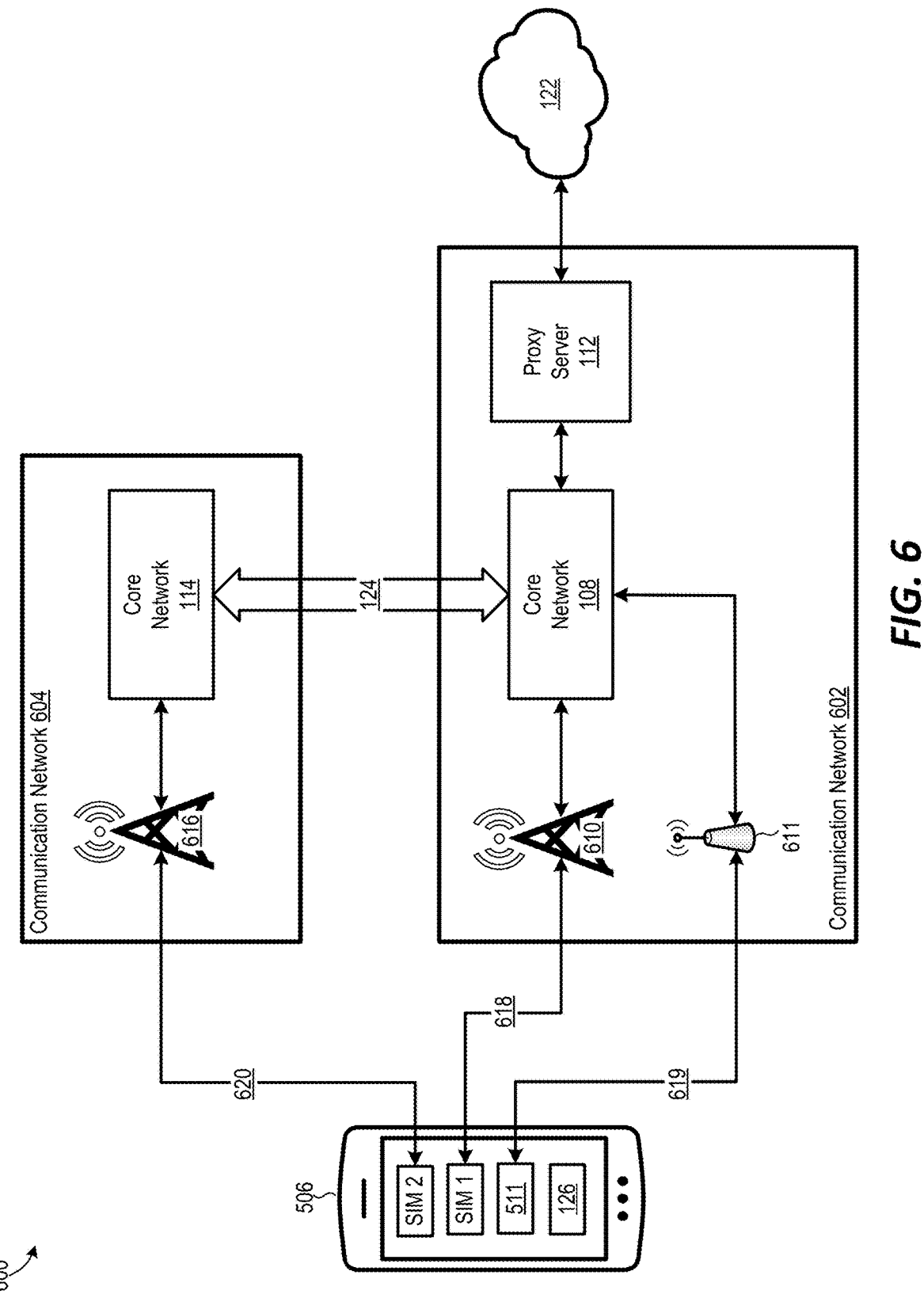
FIG. 6 is a block diagram of an embodiment of the FIG. 5 communication system including two cellular wireless access networks and a Wi-Fi wireless access network.

FIG. 6 is a block diagram of a communication system 600, which is an embodiment of communication system 500 including two cellular wireless access networks and one Wi-Fi wireless access network. Communication system 600 includes a communication network 602, a communication network 604, and an instance of UE device 506. Communication network 602 is an embodiment of communication network 502, and access networks 110 and 510 of communication network 502 are embodied by a cellular wireless access network 610 and a Wi-Fi wireless access network 611, respectively, in communication network 602. In some embodiments where core network 108 is a 3GPP mobile core network, core network 108 includes an internetworking function (not shown) to interface Wi-Fi wireless access network 611 with core network 108. Communication network 604 is an embodiment of communication network 104, and access communication network 116 of communication network 104 is embodied by a cellular wireless access network 616 in communication network 604. In some embodiments, one or more of cellular wireless access networks 610 and 616 is a 3GPP cellular wireless access network, such as a 4G, 5G, or 6G cellular wireless access network. Cellular wireless access networks 610 and 616 need not be the same type of cellular wireless networks.

Cellular wireless access network 610 and Wi-Fi wireless access network 611 support wireless access communication links 618 and 619, respectively, which are embodiments access communication links 118 and 518, respectively, of FIG. 5. Cellular wireless access network 616 supports wireless access communication link 620, which is an embodiment of access communication link 120 of FIG. 5. In some embodiments, one or more of wireless access communication links 618 and 620 comply with a 3GPP wireless communication protocol, and wireless access link 619 does not comply with a 3GPP wireless communication protocol. Proxy server 112 is advantageously configured to perform ATSSS across wireless access communication links 618, 619, and 620, even though each access link is part of a different access network and is associated with a different identity of UE device 506.

Figure 7:
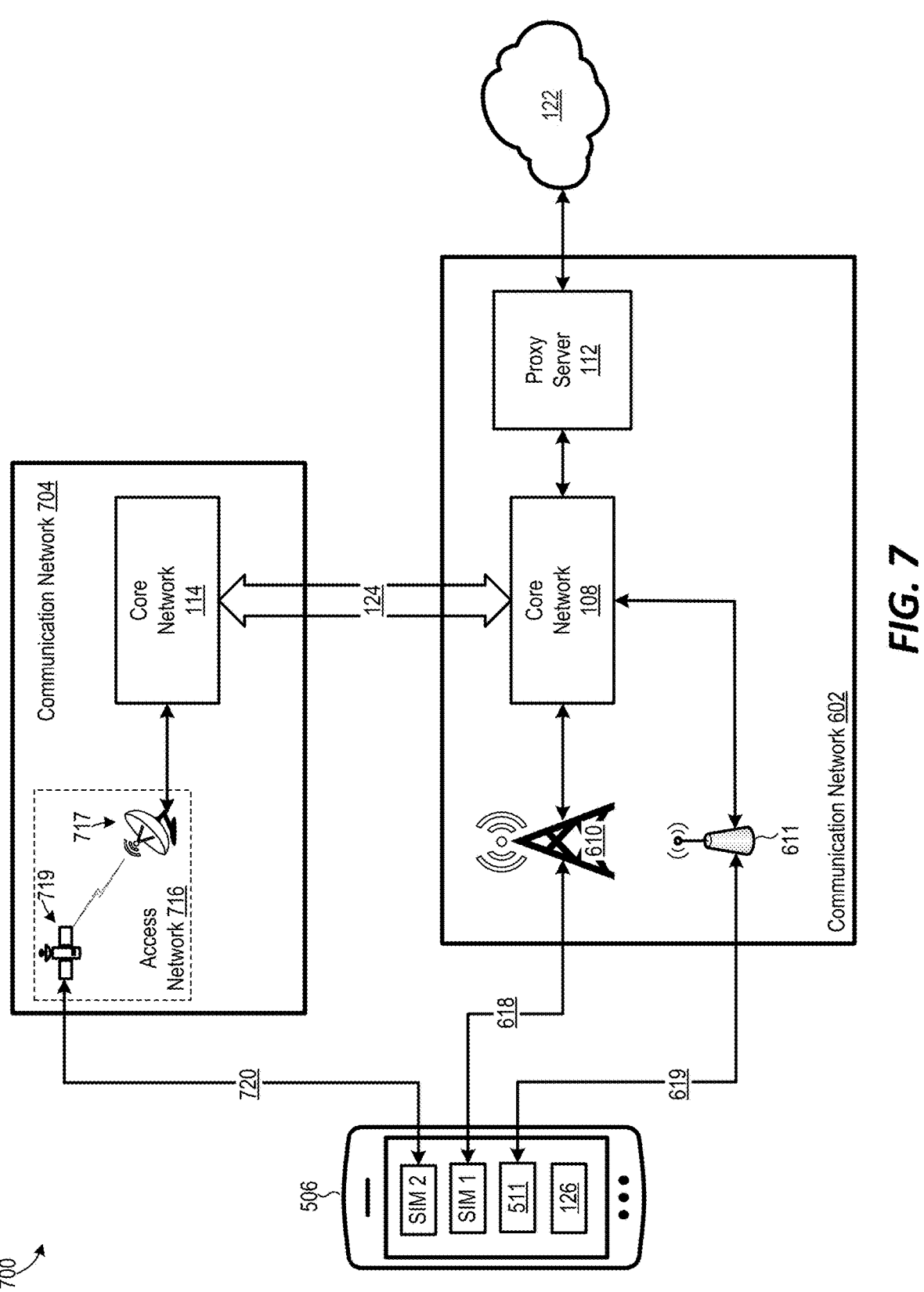
FIG. 7 is a block diagram of an alternate embodiment of the FIG. 6 communication system including a satellite wireless access network in place of a cellular wireless access network.

FIG. 7 is a block diagram of a communication system 700, which is an alternate embodiment of communication system 600 of FIG. 6 where communication network 604 is replaced with a communication 704 including a satellite wireless access network 716 in place of cellular wireless access network 616. Satellite wireless access network 716 includes one or more satellite ground stations 717 and one or more satellites 719. Satellites 719 include, for example, one or more of a low earth orbit (LEO) satellite, a medium earth orbit (MEO) satellite, and a geostationary equatorial orbit (GEO) satellite. In some embodiments where core network 114 is a 3GPP mobile core network, core network 114 includes an internetworking function (not shown) to interface satellite wireless access network 716 with core network 114. Satellite wireless access network 716 supports a wireless access link 720, which is an embodiment of access communication link 120. Proxy server 112 is advantageously configured to perform ATSSS across wireless access communication links 618, 619, and 720, even though each access communication link is part of a different access network and is associated with a different identity of UE device 506.

Figure 8:
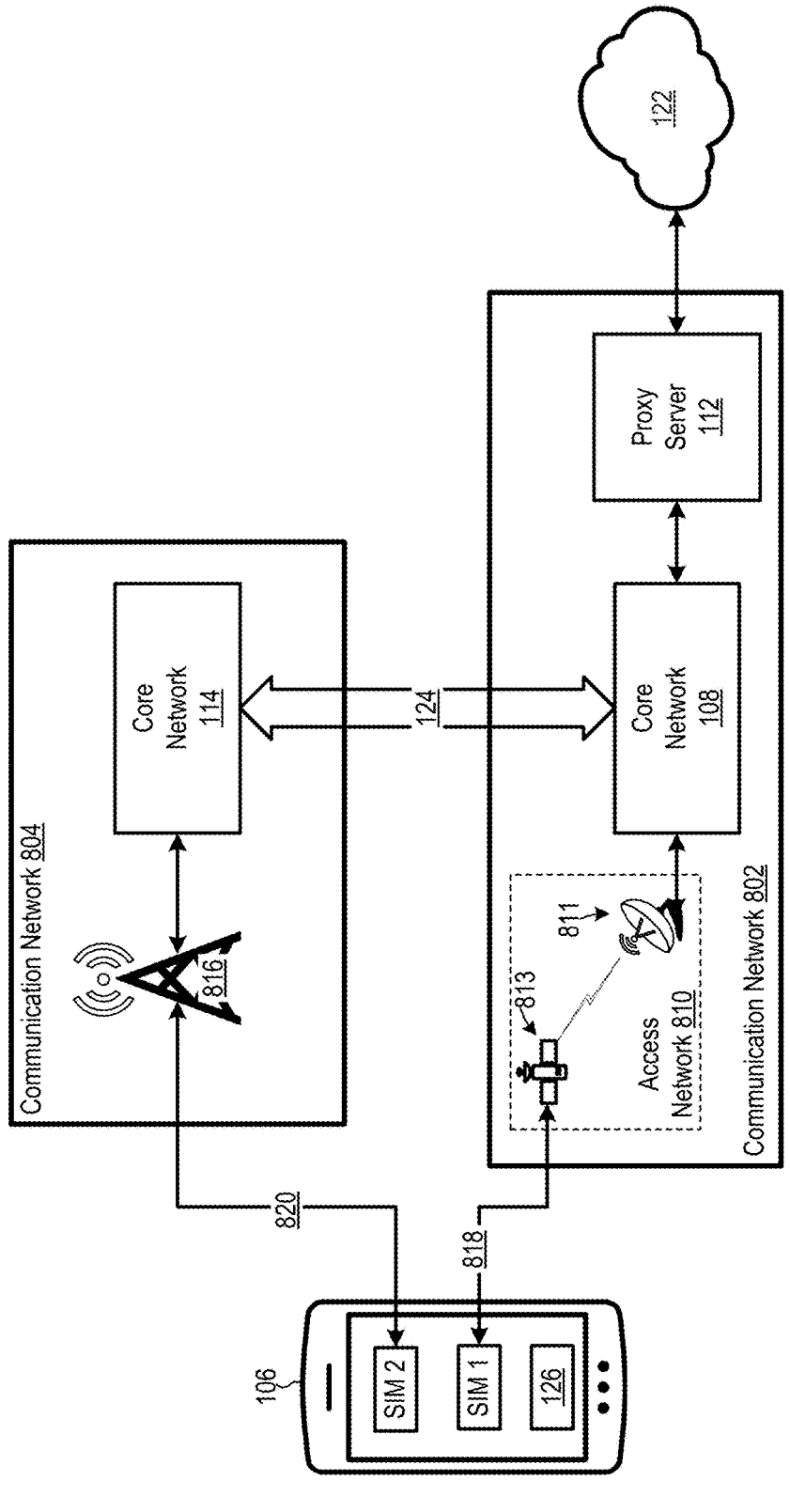
FIG. 8 is a block diagram of an embodiment of the FIG. 1 communication system including a satellite wireless access network and a cellular wireless access network.

FIG. 8 is a block diagram of a communication system 800, which is an embodiment of communication system 100 including a satellite wireless access network and a cellular wireless access network. Communication system 800 includes a communication network 802, a communication network 804, and an instance of UE device 106. Communication network 802 is an embodiment of communication network 102, and access network 110 of communication network 102 is embodied by a satellite wireless access network 810. Satellite wireless access network 810 includes one or more satellite ground stations 811 and one or more satellites 813. Satellites 813 include, for example, one or more of a LEO satellite, a MEO satellite, and a GEO satellite. In some embodiments where core network 108 is a 3GPP mobile core network, core network 108 includes an internetworking function (not shown) to interface satellite wireless access network 810 with core network 108.

Communication network 804 is an embodiment of communication network 104, and access communication network 116 of communication network 104 is embodied by a cellular wireless access network 816 in communication network 804. In some embodiments, cellular wireless access network 816 is a 3GPP cellular wireless access network, such as a 4G, 5G, or 6G cellular wireless access network.

Satellite wireless access network 810 and cellular wireless access network 816 support wireless access communication links 818 and 820, respectively, which are embodiments of access communication links 118 and 120, respectively, of FIG. 1. Proxy server 112 is advantageously configured to perform ATSSS across wireless access communication links 818 and 820, even though the two access communication links are part of different access networks and are associated with a different identities of UE device 106.

Figure 9:
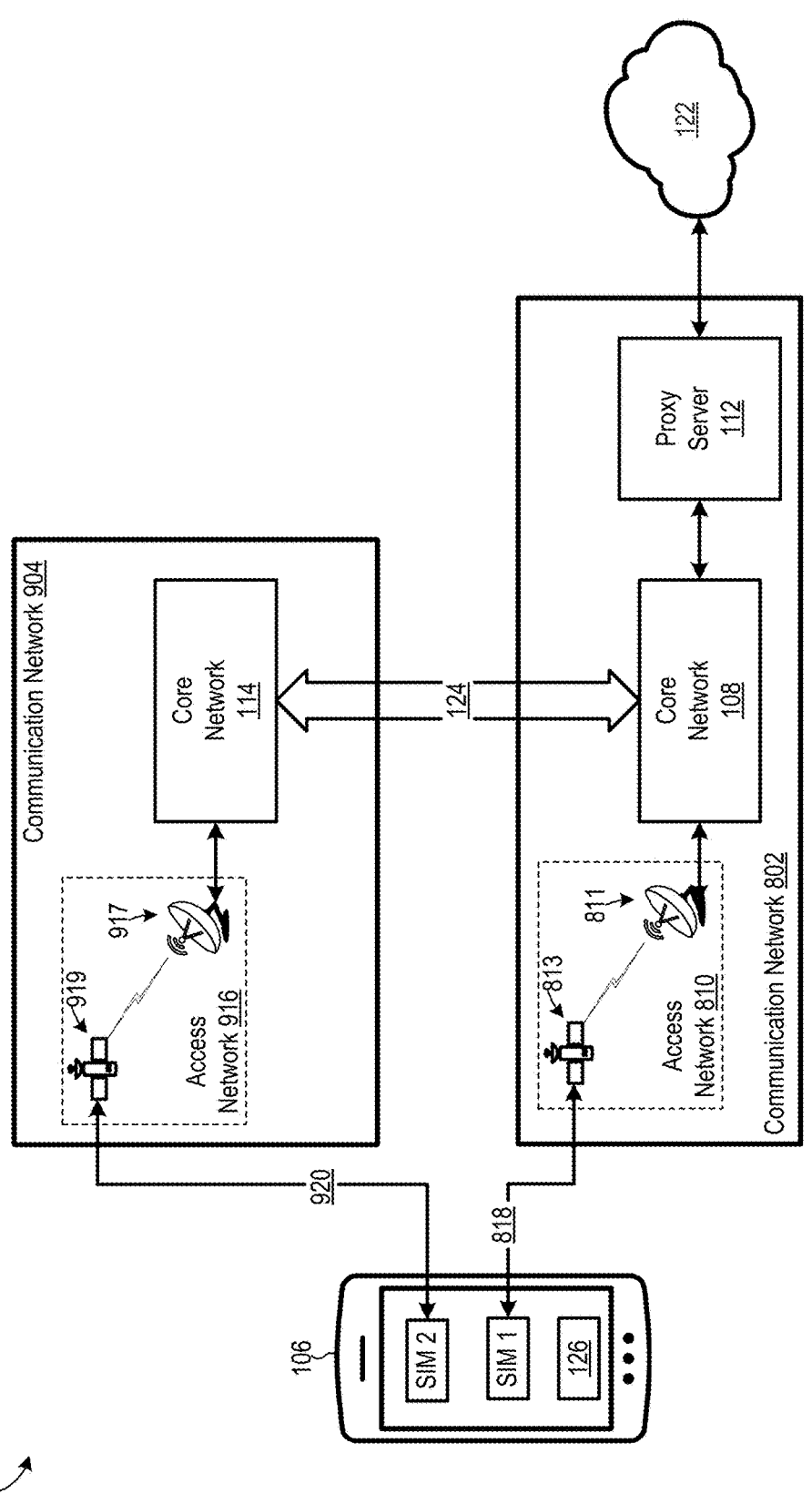
FIG. 9 is a block diagram of an alternate embodiment of the FIG. 8 communication system including two satellite wireless access networks.

FIG. 9 is a block diagram of a communication system 900, which is an alternate embodiment of communication system 800 of FIG. 8 where communication network 804 is replaced with a communication network 904 including a satellite wireless access network 916 in place of cellular wireless access network 816. Satellite wireless access network 916 includes one or more satellite ground stations 917 and one or more satellites 919. Satellites 919 include, for example, one or more of a LEO satellite, a MEO satellite, and a GEO satellite. In some embodiments where core network 114 is a 3GPP mobile core network, core network 114 includes an internetworking function (not shown) to interface satellite wireless access network 916 with core network 114. Satellite wireless access network 916 supports a wireless access link 920, which is an embodiment of access communication link 120. Proxy server 112 is advantageously configured to perform ATSSS across wireless access communication links 818 and 920, even though the two access communication links are part of different access networks and are associated with different identities of UE device 106.

Referring again to FIG. 1, inclusion of proxy server 112 in communication system 100 enables communication system 100 to perform ATSSS even though a different IP address is associated with each of SIM 1 and SIM 2. However, any of communication systems 100, 500, 600, 700, 800, and 900 could be modified to support ATSSS without use of proxy server 112 by modifying core network 108 to assign a common IP address to each identity of a given UE device.

Figure 10:
FIG. 10 is a block diagram of an alternate embodiment of FIG. 1 communication system that is configured to assign a common Internet Protocol (IP) address to each identity of a user equipment device, according to an embodiment.

For example, FIG. 10 is a block diagram of a communication system 1000, which is an alternate embodiment of communication system 100 that is configured to assign a common IP address to each identity of a given UE device. Communication system 1000 differs from communication system 100 of FIG. 1 as follows: (a) communication network 102 is replaced with a communication network 1002 including a core network 1008 in place of core network 108, and (b) proxy server 112 is omitted. Core network 1008 is the same as core network 108 of FIG. 1 except that core network 1008 is further configured to assign a common IP address to each identity of a given UE device. Accordingly, communication system 1000 of FIG. 10 operates in the same manner as communication system 100 of FIG. 1 except that (a) core network 1008 assigns a common IP address to each of the first identity of UE device 106 (established by SIM 1) and the second identity of UE 106 device (established by SIM 2) and (b) communication network 1002 is capable of performing ATSSS without use of proxy server 112. In particular embodiments, core network 1008 is configured to create ATSSS polices and rules spanning the multiple identities of UE device 106, and core network 1008 is configured to cooperate with ATSSS client 126 to enforce these policies and rules.

The common IP address assigned to each identity of UE device 106 could be either a dynamic IP address or a static IP address, depending on the implementation of core network 1008 and/or subscription information associated with UE device 106. In certain embodiments, core network 1008 is based on a 3GPPP mobile core network that is modified such that a Packet Data Network (PDN) Gateway (PGW) of core network 1008, or session and user plane management functions of core network 1008, is/are configured to allocate a common IP address to each SIM of UE device 106. In particular embodiments, UE device 106 is configured to indicate to core network 1008 that it supports multiple SIMs as well as ATSSS, and core network 1008 is configured to respond accordingly by tying a single IP address to each SIM of UE device 106 during a PDN establishment procedure.

Some embodiments of core network 1008 are configured to (a) determine that each SIM is associated with a common UE device, and (b) tie respective subscriptions associated with each SIM of UE device 106, or respective identities associated with each SIM of UE device 106, to a common identifier of UE device 106, to enable a common IP address to be assigned to each SIM identity. For example, in certain embodiments where UE device 106 complies with a 3GPP 4G cellular wireless standard, core network 1008 is configured to tie respective International Mobile Subscriber Identities (IMSIs) of each SIM to a common International Mobile Equipment Identity (IMEI) of UE device 106, to link PDU sessions associated with each SIM and thereby enable a common IP address to be assigned to each SIM. As another example, in certain embodiments where UE device 106 complies with a 3GPP 5G cellular wireless standard, core network 1008 is configured to tie respective Subscription Permanent Identifiers (SUPIs) of each SIM to a common Permanent Equipment Identifier (PEI) of UE device 106, to link PDU data sessions associated with each SIM and thereby enable a common IP address to be assigned to the respective protocol stack associated with each SIM.

Figure 11:
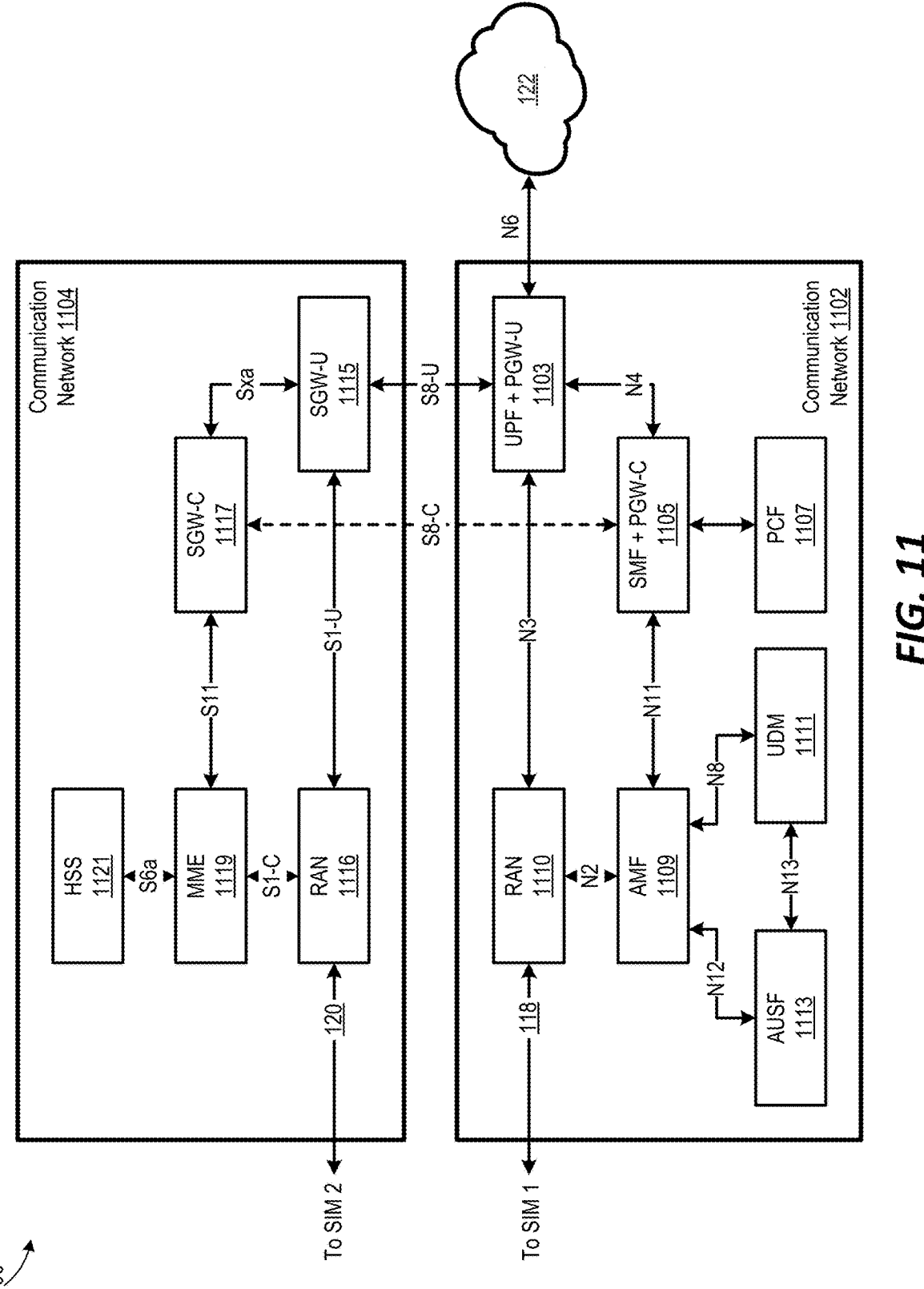
FIG. 11 is a block diagram of an embodiment of the FIG. 10 communication system where two core networks have different respective architectures.

FIG. 11 is a block diagram of a communication system 1100, which is one embodiment of communication system 1000 of FIG. 10 where the two core networks have different respective architectures. UE device 106 is not shown in FIG. 11 for illustrative clarity. Communication system 1100 includes a communication network 1102 and a communication network 1104, which are embodiments of communication networks 1002 and 1004, respectively, of FIG. 10. Communication network 1102 includes a UPF and a control PGW 1103, a SMF and a control PGW 1105, a PCF 1107, an AMF 1109, a UDM 1111, and an AUSF 1113, that collectively form an embodiment of core network 1008 that is based on a 3GPP 5G standard. Communication network 1102 further includes a 5G cellular radio access network (RAN) 1110, which is an embodiment of access network 110. Communication network 1104, on the other hand, includes a user plane SGW-U 1115, a control plane SGW-C 1117, an MME 1119, and a Home HSS 1121, that collectively form an embodiment of core network 114 that is based on a 3GPP 4G standard. Communication network 1104 further includes a combined 4G and 5G cellular RAN 1116, which is an embodiment of access network 116.

UPF+PGW-C 1103 and SGW-U 1115 are linked by a 3GPP S8-U roaming interface, and SMF+PGW-C 1105 and SGW-C 1117 are linked by a 3GPP S8-C roaming interface. The S8-U and S8-C interfaces collectively form an embodiment of interface 124 of FIG. 10. In the FIG. 11 embodiment, SIM 2 is authenticated by communication network 1104 via the S6a interface with HSS 1121. One or more of UPF+PGW-UC 1103 and SMF+PGW-C 1105 assign a common IP address to the protocol stack of each of SIM 1 and SIM 2 in communication system 1100, even though the two SIMs are associated with different communication networks 1102 and 1104, respectively. Consequently, ATSSS can be performed across communication links 118 and 120, such as by the core network of communication network 1102 and/or another entity, even though the communication links are associated with different access networks.

Figure 12:
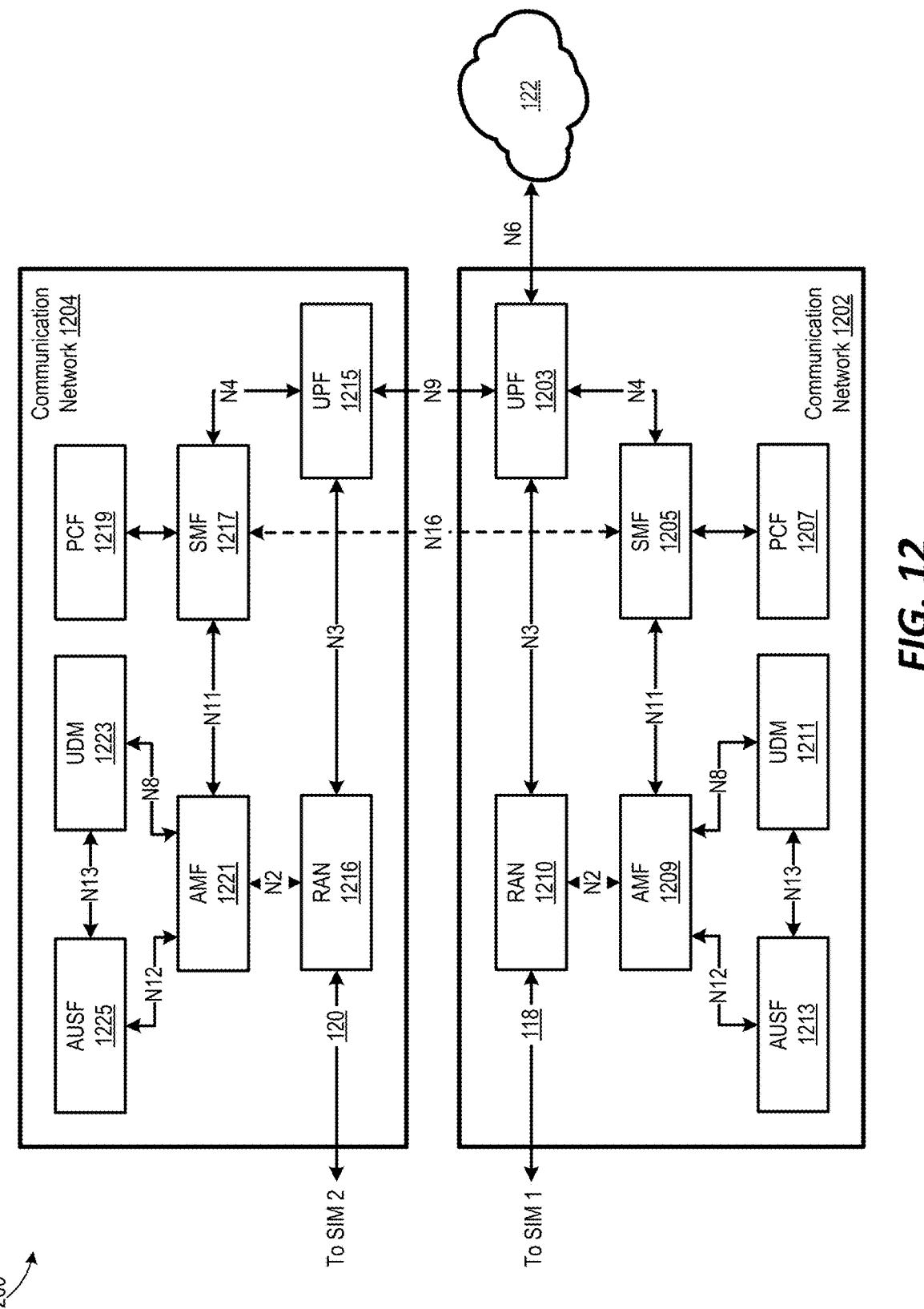
FIG. 12 is a block diagram of an embodiment of the FIG. 10 communication system where two core networks have a common high-level architecture.

FIG. 12 is a block diagram of a communication system 1200, which is one embodiment of communication system 1000 of FIG. 10 where the two core networks have a common high-level architecture based a 3GPP 5G standard. UE device 106 is not shown in FIG. 12 for illustrative clarity. Communication system 1200 includes a communication network 1202 and a communication network 1204, which are embodiments of communication networks 1002 and 104, respectively, of FIG. 10. Communication network 1202 includes a UPF 1203, a SMF 1205, a PCF 1207, an AMF 1209, a UDM 1211, and an AUSF 1213, which collectively form an embodiment of core network 1008 that is based on a 3GPP 5G standard. Communication network 1202 further includes a 5G cellular RAN 1210, which is an embodiment of access network 110. Communication network 1204 includes a UPF 1215, a SMF 1217, a PCF 1219, an AMF 1221, a UDM 1223, and an AUSF 1225, which collectively form an embodiment of core network 114 that is based on a 3GPP 5G standard. Communication network 1204 further includes a 5G cellular RAN 1216, which is an embodiment of access network 116.

UPF 1203 and UPF 1215 are linked by a 3GPPS N9 roaming interface, and SMF 1205 and SMF 1217 are linked by a 3GPP N16 roaming interface. The N9 and N16 interfaces collectively form an embodiment of interface 124 of FIG. 10. Although communication networks 1202 and 1204 share N9 and N16 interfaces, the two communication networks use respective N8 and N12 interfaces. UPF 1203 and/or SMF 1205 assign a common IP address to each of SIM 1 and SIM 2 in communication system 1200, even though the two SIMs are associated with different communication networks 1202 and 1204, respectively. Consequently, ATSSS can be performed across communication links 118 and 120, such as by the core network of communication network 1202 and/or another entity, even though the communication links are associated with different access networks.

ATSSS Examples

Discussed below with respect to Examples A-F are several examples of how any of communication system 100, 500, 600, 700, 800, 900, 1000, 1100, or 1200 could perform ATSSS. It is understood, however, that these communication systems are not limited to operating according to the examples below. Additionally, while the examples below discuss ATSSS in the context of communication system 100 for simplicity, it is understood that the examples could be adapted to any of communication system 500, 600, 700, 800, 900, 1000, 1100, or 1200. For instance, in embodiments where proxy server 112 is omitted, ATSSS could be enabled by assigning a common IP address to each identity of a UE device, and ATSSS could be performed by a core network and/or other entity according to the examples below.

Example A

In certain embodiments, proxy server 112 is configured to perform ATSSS in response to an indication received from UE device 106, or in response to an indication received from communication network 102 and/or communication network 104, that UE device 106 is transitioning from one communication network to another. For example, consider a scenario where (a) UE device 106 is initially being served by communication network 102 and (b) UE device 106 transitions from communication network 102 to communication network 104 such that UE device 106 is now being served by communication network 104. Proxy server 112 may receive a notification of the transition from UE device 106 and/or one or more of communication networks 102 and 104. In response to the notification, proxy server 112 may switch data traveling between UE device 106 from access communication link 118 to access communication link 120 to minimize, or even essentially eliminate, perceptible service discontinuity from the transition.

Example B

In certain embodiments, proxy server 112 is configured to perform ATSSS at least partially in response to measurements provided by UE device 106. Such measurements may indicate, for example, one or more of (a) throughput of access communication links 118 and/or 120, as experienced by UE device 106, (b) latency of access communication links 118 and/or 120, as experienced by UE device 106, (c) packet loss of access communication links 118 and/or 120, as experienced by UE device 106, and (d) received signal strength of access communication links 118 and/or 120. For example, consider a scenario where (a) UE device 106 is initially being served by access network 110, (b) UE device 106 begins to move away from infrastructure of access network 110, thereby causing received signal strength of access communication link 118 to decrease, (c) UE device 106 performs a received signal strength measurement capturing the decrease of access communication link 118 received signal strength, and (d) UE device 106 sends the measurement to proxy server 112. Proxy server 112 may switch data traveling between UE device 106 from access communication link 118 to access communication link 120 in response to the measurement received from UE device 106, to minimize, or even essentially eliminate, perceptible service discontinuity from UE device 106 moving away from infrastructure of access network 110.

Example C

In certain embodiments, proxy server 112 is configured to perform ATSSS at least partially in response to measurements provided by communication network 102 and/or communication network 104. Such measurements may indicate, for example, one or more of (a) current load on communication network 102 and/or communication network 104 (or a related metric, such as current spare network capacity), (b) historical load on communication network 102 and/or communication network 104 (or a related metric), (c) current performance of communication network 102 and/or communication network 104, and (d) historical performance of communication network 102 and/or communication network 104. For example, consider a scenario where (a) communication network 102 is a MSO network and communication network 104 is a MNO network, (b) the MSO would prefer that UE device 106 be served by access communication link 118, instead of by access communication link 120, when feasible, to minimize cost to the MSO associated with UE device 106 using the MNO's communication network, (c) UE device 106 is currently being served by access network 104 due to a previous measurement from communication network 102 showing that it is highly loaded, and (d) communication network 102 provides an updated measurement to proxy server 112 indicating that the load on communication network 102 has dropped to a level that will enable the communication network to support additional UE devices. Proxy server 112 may switch data traveling between UE device 106 and external network resources 122 from access communication link 120 to access communication link 118 in response to the measurement received from communication network 102, to minimize cost to the MSO associated with UE device 106 using the MNO's communication network.

Example D

In certain embodiments, proxy server 112 is configured to perform ATSSS at least partially in response to inferences made from signaling exchanged between UE device 106 and one or more of communication network 102 and communication network 104. For example, consider a scenario where (a) UE device 106 is initially being served by communication network 102 and (b) proxy server 112 infers from signaling between UE device 106 and access network 110 that access communication link 118 is exhibiting poor performance. Proxy server 112 may infer that access communication link 118 is exhibiting poor performance, for example, by (a) signaling between UE device 106 and access network 110 indicating excessive communication retries, (b) signaling between UE device 106 and access network 110 indicating excessive packet loss by access communication link 118, and/or (c) signaling between UE device 106 and access network 110 indicating a significant decrease in modulation order of access communication link 118. Proxy server 112 may switch data traveling between UE device 106 and external network resources 122 from access communication link 118 to access communication link 120 in response to the interference to minimize, or even essentially eliminate, service impairment to UE device 106 resulting from poor performance of access communication link 118.

Example E

In certain embodiments, proxy server 112 is configured to perform ATSSS at least partially based on type of traffic flowing between UE device 106 and external network resources 122. For example, consider a scenario where (a) communication network 102 is a MSO network and communication network 104 is a MNO network, (b) the MSO would prefer that UE device 106 be served by access communication link 118, instead of by access communication link 120, when feasible, to minimize cost to the MSO associated with UE device 106 using the MNO's communication network, (c) access communication link 118 is currently exhibiting high latency, and (d) access communication link 120 is current exhibiting low latency. In response to this scenario, proxy server 112 may (a) steer data that is latency sensitive, e.g., real-time communication data, to access communication link 120, and (b) steer data that is not latency sensitive, e.g., File Transfer Protocol (FTP) data, to access communication link 118, so that UE device 106 receives adequate service while helping minimize use of the MNO communication network.

Example F

In certain embodiments, proxy server 112 is configured to perform ATSSS at least partially based on subscription and/or policy configuration associated with UE device 106 and/or a user of UE device 106. For example, consider a scenario (a) communication network 102 is a MSO network and communication network 104 is a MNO network, (b) the MSO would prefer that UE device 106 be served by access communication link 118, instead of by access communication link 120, when feasible, to minimize cost to the MSO associated with UE device 106 using the MNO's communication network, (c) the MSO offers a "gold" service plan and a "silver" service plan, (d) the gold service plan offers a higher service level than the silver service plan but at a higher cost than the silver service plan, (e) access communication link 118 is currently exhibiting acceptable performance and access communication link 120 is currently exhibiting superior performance. Proxy server 112 may steer data between UE device 106 and external network resources 122 as a function of a type of subscription associated with UE device 106. For example, proxy server 112 may steer data to access communication link 120 if UE device 106 subscribes to the gold service plan to provide superior service, while proxy server 112 may steer data to access communication link 118 if UE device 106 subscribes to the silver service plan, to minimize cost to the MSO.

Extensions to 3GPP Standards to Support Multi-SIM ATSSS

As discussed above, some embodiments of the new systems disclosed herein include core networks based on a 3GPP mobile core. Conventional 3GPP standards, though, do not support ATSSS with UE having multiple SIMs. However, Applicant has developed extensions to 3GPP standards, discussed below, which at least partially enable ATSSS with UE having multiple SIMs, in H-MVNO communication systems. Certain embodiments of the new systems and methods disclosed above support one or more of the following extensions. It is understood, though, that the following extensions are provided for solely by way of example, and the new systems and methods disclosed above may support ATSSS with UE having multiple SIMs using alternative and/or additional techniques than those of the extensions below.

A. S8-C and S8-U Interface Sharing

The packet session anchor is in the H-MVNO core network with the S8-C and S8-U interface sharing architecture. Consequently, it is possible to enable ATSSS functionality between an MNO 3GPP access (4G) network and an H-MVNO's non-3GPP access (e.g., Wi-Fi) networks. The level of customization required depends on whether ATSSS support is desired across the coverage footprint of both H-MVNO's 5G and MNO's 4G service areas. Enhancements to leverage ATSSS with a MNO's 4G access network can be categorized as follows.

1. Enabling ATSSS Outside of an H-MVNO 5G Coverage Area (e.g., Between MNO's 4G and H-MVNO's Wi-Fi Access)

In this scenario, ATSSS is envisioned only between the MNO 4G and H-MVNO's Wi-Fi access network, i.e., from the perspective of ATSSS implementation, Wi-Fi access is associated with the MNO 4G and not with the H-MVNO's 5G access, and Wi-Fi is ATSSS enabled only outside of the H-MVNO's coverage area. This option allows the UE to take advantage of the H-MVNO's extensive Wi-Fi access network (and partnerships) outside its 5G coverage footprint and use it in conjunction with the MNO's 4G network to deliver a better experience through increased speed (bonding), intelligent offload (steering), and seamless switching. However, the H-MVNO will be unable to leverage its Wi-Fi network for ATSSS to deliver similar improvements when the UE is accessing its 5G access network networks.

2. Enabling ATSSS Both Inside and Outside of an H-MVNO Coverage Area (e.g., with MNO's 4G Outside of H-MVNO Coverage and with H-MVNO's 5G Inside of H-MVNO Coverage Area).

In this scenario, ATSSS is enabled both outside and inside of the H-MVNO's 5G coverage area. When outside of the coverage of the H-MVNO's 5G access network, ATSSS is enabled between the MNO's 4G and the H-MVNO's Wi-Fi access networks. When inside of the coverage of the H-MVNO 5G access network, ATSSS is enabled between the H-MVNO's 5G and the Wi-Fi access networks. This option requires customization within the UE.

Figure 13:
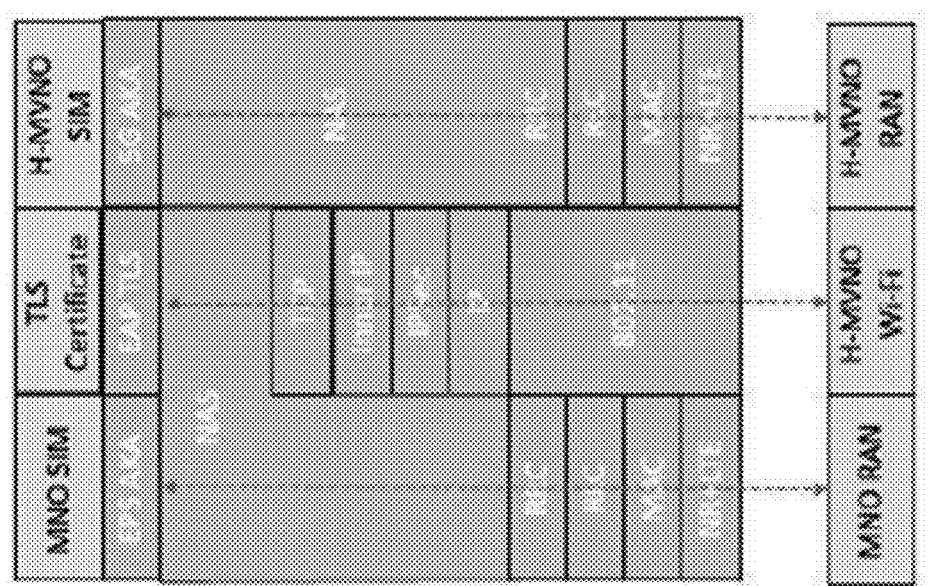
FIG. 13 illustrates a control plane protocol stack with Transport Layer Security (TLS) as a secondary credential for Wi-Fi access.
Figure 13:
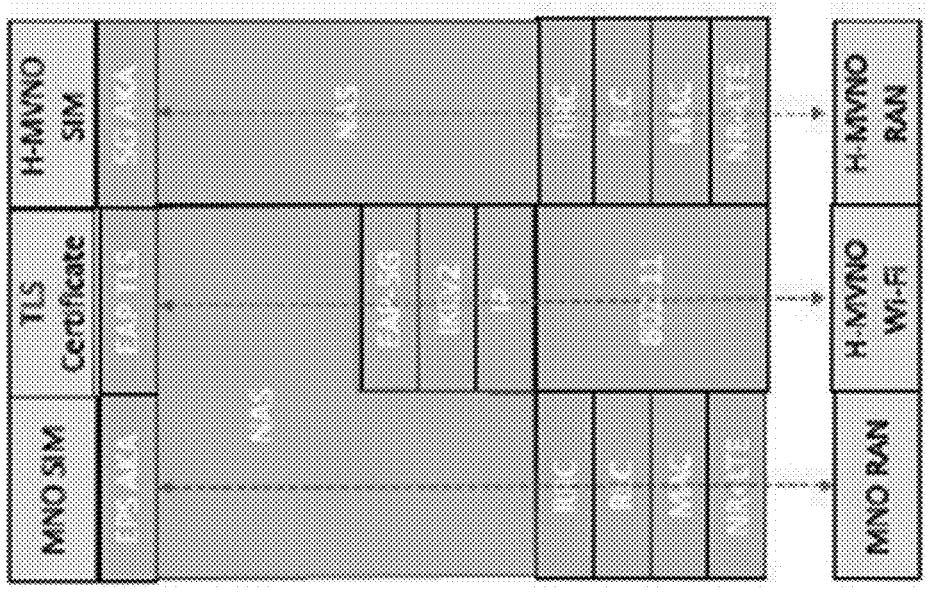

In 5G, unlike in 4G, NAS signaling between the UE and the 5GC has been specified for Wi-Fi access as well as for 3GPP access networks. Therefore, to enable ATSSS across 4G and Wi-Fi, the UE protocol stack must support a dual registration mode of operation for the protocol stack associated with the MNO SIM. However, since the MNO SIM credentials are provisioned in the MNO network, this creates a challenge in authenticating the registration request from the UE by H-MVNO's AMF. In particular, a security key associated with the MNO SIM is provisioned in MNO's HSS and hence requires the authentication interface between the MNO and the H-MVNO networks (e.g., SWd) when the UE registers with the H-MVNO's 5G core via its Wi-Fi access network. Additionally, an interworking function to translate between the 5G's N8 and the 4G's SWd interfaces is needed. The following are two potential approaches to circumvent the need for the authentication interface and the interworking function:

(1) UE is provisioned with a secondary credential (e.g., a H-MVNO's certificate) to access H-MVNO's Wi-Fi access network via the protocol stack associated with the MNO SIM. This allows the H-MVNO to authenticate and authorize access to its Wi-Fi access network using non-MNO SIM credentials. FIG. 13 depicts the UE protocol stack with the associated credentials. FIG. 13 also shows the credentials used for the different signaling paths-MNO 4G access, H-MVNO 5G access, and H-MVNO Wi-Fi access.

Figure 14:
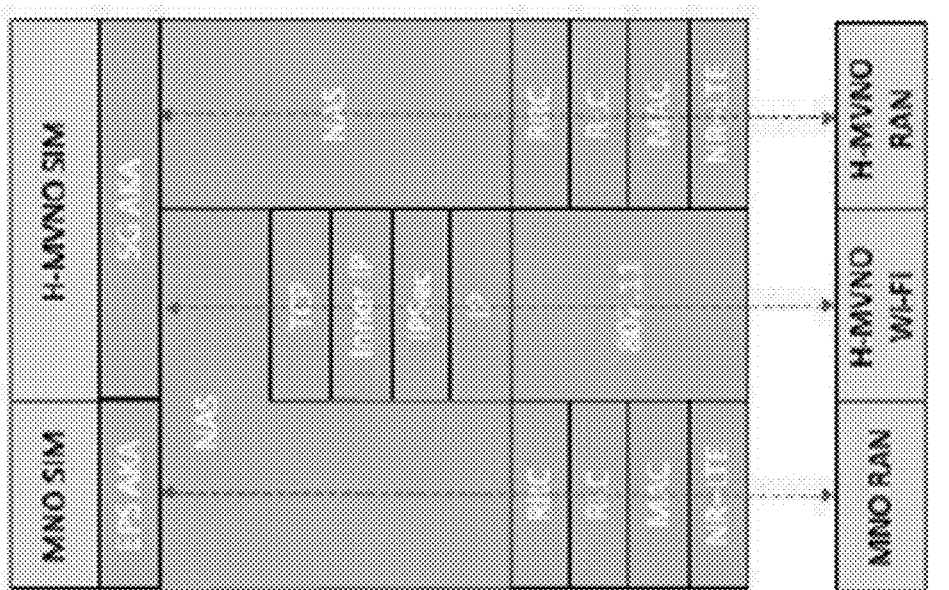
FIG. 14 illustrates a control plane protocol stack with a hybrid mobile virtual network operator (H-MVNO) subscriber identity module (SIM) as a secondary credential for Wi-Fi access.
Figure 14:
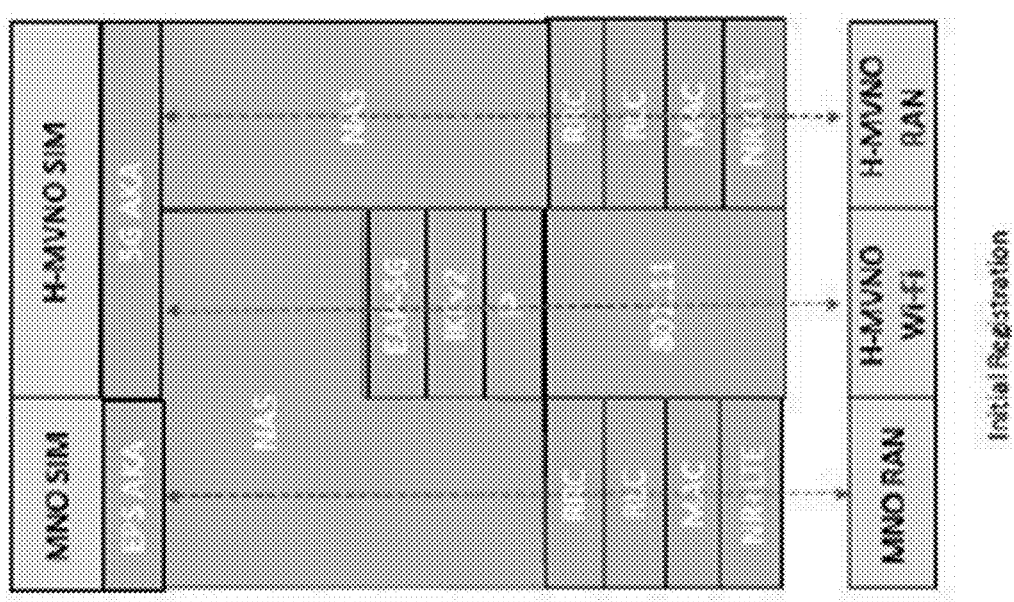

(2) An alternative approach, as shown in FIG. 14, is for the UE to be capable of utilizing H-MVNO SIM credentials (as a secondary credential) when registering via an H-MVNO's Wi-Fi access network using the NAS protocol stack associated with the MNO SIM.

The above two solutions resolve the issues associated with authenticating UE registration via non-3GPP access using a NAS stack associated with a MNO SIM, without requiring interworking or inter-operator interfaces. However, to ensure that the same SMF and UPF are assigned to anchor the sessions established via MNO's 4G and H-MVNO's Wi-Fi access networks, further feature enhancements and provisioning are required within H-MVNO's 5G core network.

The UE will be configured to enable establishment of MA-PDU sessions over MNO's 4G core network. When establishing a MA PDU connection via MNO's 4G core network, the UE will indicate that the PDN connection is for a new MA PDU session as specified in TS 24.193 and TS 24.301. As per the specifications, during the PDN connection establishment over MNO's 4G network, the UE will transparently pass the ATSSS information including the PDU Session ID via the PCO IE in the PDU Connectivity Request message. The serving SMF instance within the SMF Set will store the PDU Session Context along with MNO IMSI as the associated SUPI. During subsequent PDU session establishment over the Wi-Fi network, it will provide the PDU Session ID to H-MVNO's AMF in the NAS message so that the AMF can retrieve the serving SMF instance for that PDU Session ID by querying the UDM.

Figure 15:
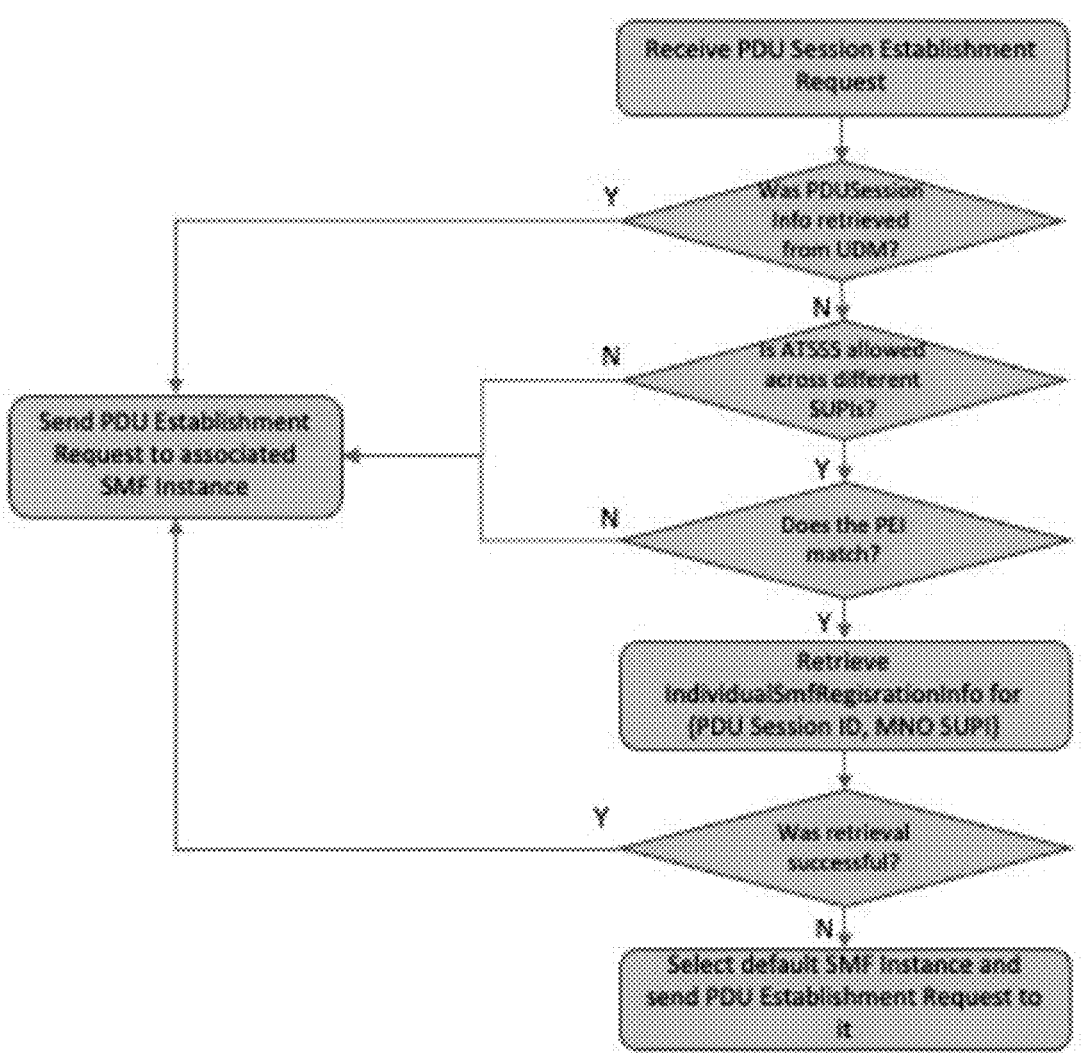
FIG. 15 is a flow chart illustrating enhancements in Access Management Mobility Function (AMF) for selecting a common Session Management Function (SMF) instance for user equipment (UE) devices with multiple Subscription Permanent Identifiers (SUPIs), according to an embodiment.

However, since the SUPI is going to be different from MNO IMSI, a query from the AMF to retrieve the UE Context in SMF Data from the UDM will fail. To successfully retrieve information of the SMF instance serving the PDU Session ID established via MNO's 4G network, the AMF will have to query the IndividualSmfRegistrationInfo using MNO IMSI as the SUPI. This alternative SUPI is part of an enhanced subscription information retrieved by the AMF during the initial registration procedure. FIG. 15 describes enhancements included within the AMF to ensure that the same SMF instance is assigned to both legs of the MA PDU session.

The anchor SMF also needs to be enhanced to link the two legs of the MA PDU session established using different SUPIs. This SMF enhancement includes association of PDU sessions established via MNO's 4G and H-MVNO's core networks, selection of a common UPF anchor, and creation of ATSSS rules based on the ATSSS PCC rules retrieved from the PCC for the secondary credential and communicating the rules via H-MVNO's Wi-Fi leg of the NAS connection to the UE.

Figure 16:
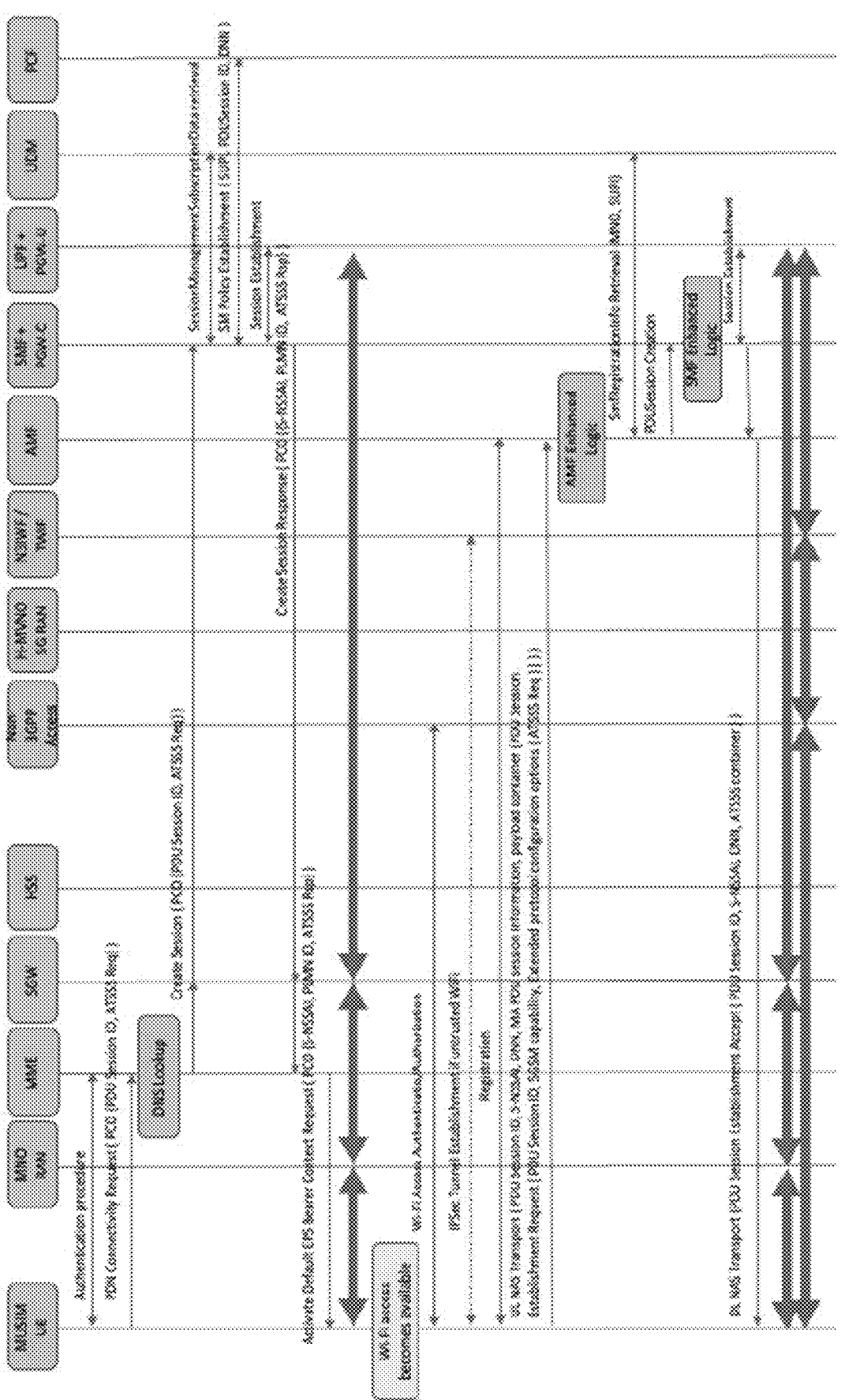
FIG. 16 depicts a high-level call flow associated with setting up of a multi-access (MA) packet data unit (PDU) session spanning across different identifiers, according to an embodiment.

FIG. 16 depicts a high-level call flow associated with the setting up of MA PDU session spanning across different identifiers.

In addition to the above enhancements in the AMF and SMF, a H-MVNO must provision subscription profiles for the MNO IMSI and the NAI associated with the secondary credential. For these additional identifiers, with the exception of the authentication parameters, all other subscription profile parameters can be set to the same value as that for the H-MVNO IMSI. For the MNO IMSI, the authentication related parameters can be set to dummy values, since the UE is not expected to register with H-MVNO's 5G core network using the MNO SIM. The UDR must be capable of being configured with dummy values for the authentication parameters associated with the MNO IMSI.

The provisioning of a subscription profile associated with MNO SIM and NAI associated with the TLS credentials (if applicable) is required since the UE context is generally queried from the UDM using SUPI as the identifier in the HTTP GET request messages. As described above, AMF and SMF instances receiving the request will have to query IndividualSmfRegistrationInfo from the UDM to identify the serving SMF for the PDU Session ID. The query request requires SUPI as a key within the Resource URI for the UDM to lookup the SMF registration information within the UDR. Provisioning MNO IMSI and TLS NAI within the MNO UDR minimizes changes to the 3GPP specified data models to enable ATSSS between sessions established using different SUPIs.

During PDU session establishment, if the AMF does not receive the serving SMF information for the indicated PDU Session ID, then while retrieving the UE Context In SMF Data from the UDM during the registration procedure, the AMF will query IndividualSmfRegistrationInfo for the received PDU Session ID using MNO SUPI received as part of the MUSIM ATSSS vendor specific extension in AccessAndMobilitySubscriptionData to identify the serving SMF. It will then forward the MA PDU Session Establishment Request to the SMF Instance received in the IndividualSmfRegistrationInfo from the UDM. If none was received, then AMF will pick a default SMF Instance.

For the SMF to implement its enhanced logic to enable ATSSS between PDU sessions established using different SUPIs, a similar vendor specific extension is required as part of the 3GPP specified SessionManagementSubscriptionData data resource. To provide flexibility to the H-MVNOs to enable/disable ATSSS across MNO 4G and H-MVNO Wi-Fi on a per DNN basis, additional flag is added to the DnnConfiguration data resource as a vendor specific extension as well. This flag will indicate to the SMF whether the ATSSS across PDU sessions established via MNO 4G and H-MVNO Wi-Fi is allowed or not for the associated DNN.

The above approach assumes that the UE will always establish the first leg of the MA PDU session via MNO's 4G network and the second leg of the MA PDU session via Wi-Fi network. However, under certain situations (e.g., MNO RAN node failure in the vicinity of the UE), it is possible that due to lack of coverage from the MNO network, the UE may establish the first leg of the MA PDU session via H-MVNO's Wi-Fi network and the second leg via MNO's 4G network.

Figure 17:
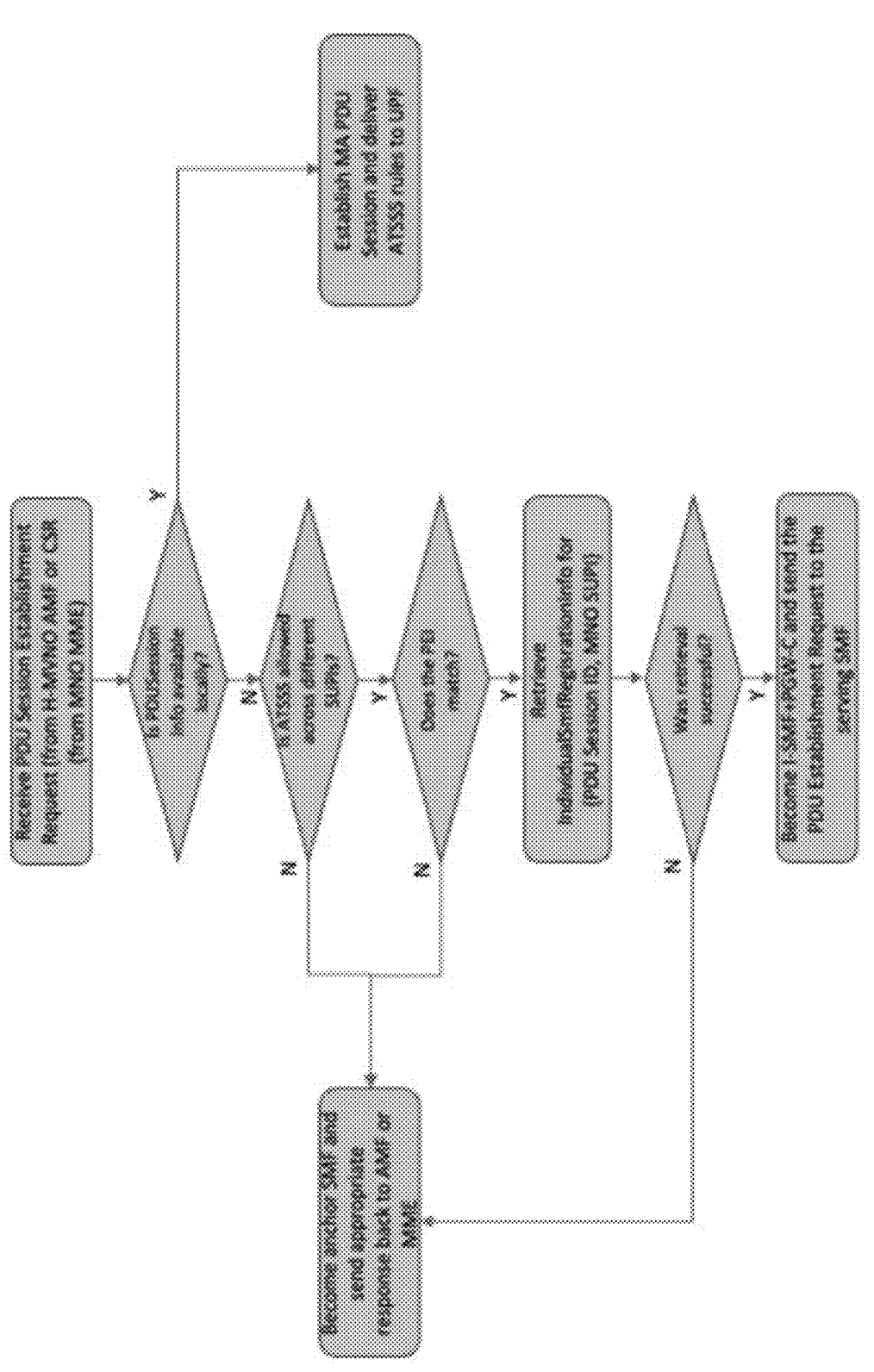
FIG. 17 is a flow chart illustrating enhancements in SMF for selecting a common SMF instance for UEs with multiple SUPIs, according to an embodiment.
Figure 18:
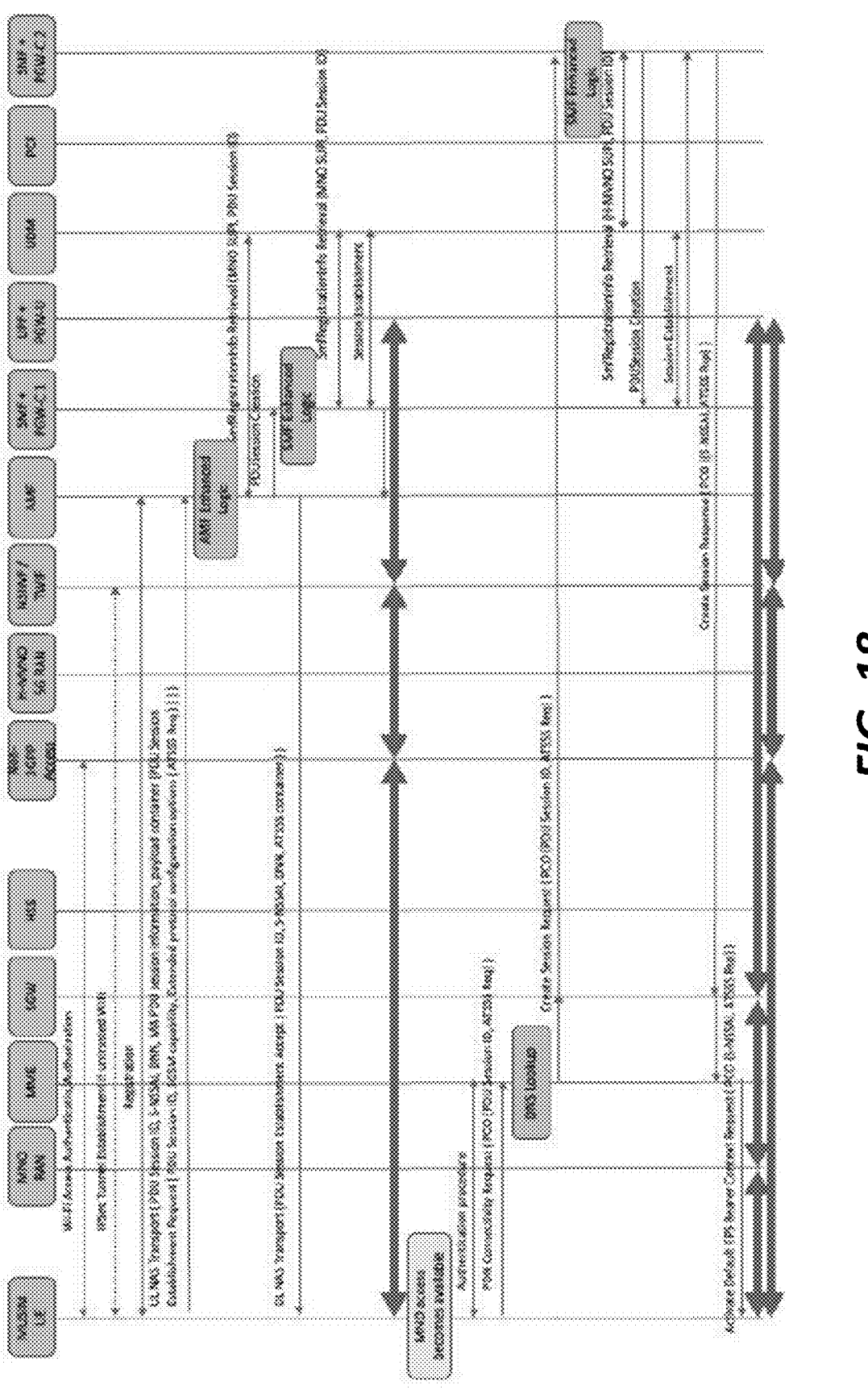
FIG. 18 depicts a high-level call flow showing implementation of ATSSS with mobile network operator 3GPP and H-MVNO Wi-Fi.

In this scenario, the MNO 4G network will not have any knowledge of the anchor SMF+PGW-C and will select an SMF+PGW—C based on local configuration or the location of the UE. This could result in selection of an SMF+PGW-C that is different than the instance where the MA PDU session is anchored. In this event, UE context is locally unavailable at the selected SMF+PGW-C, and it needs to be enhanced to query the IndividualSmfRegistrationInfo and determine the anchor SMF using the combination of the PDU Session ID and the alternate SUPI. After it has detected the serving SMF Instance, it can either function as an intermediate SMF+PGW-C or initiate the SMF transfer procedure. A SMF transfer procedure could be initiated by the serving SMF after the UE has transitioned to idle state. Enhancements within the SMF are depicted in FIG. 17, and FIG. 18 depicts a high-level call flow showing the implementation of the logic.

Generally, VoWiFi has been used by operators to provide voice services when outside their coverage area (e.g., in the basement of a building). However, it is unclear whether a UE's protocol stack will be able to simultaneously connect to both N3IWF and an ePDG (in MNO's core network) using different credentials. The implementation is likely UE vendor specific. If the UE vendor cannot support connectivity to both ePDG (using MNO SIM credentials) and N3IWF (using H-MVNO TLS or SIM credentials,) then the UE will need to have the ability for the operator/subscriber to enable/toggle between VoWiFi and MUSIM ATSSS capabilities.

Figure 19:
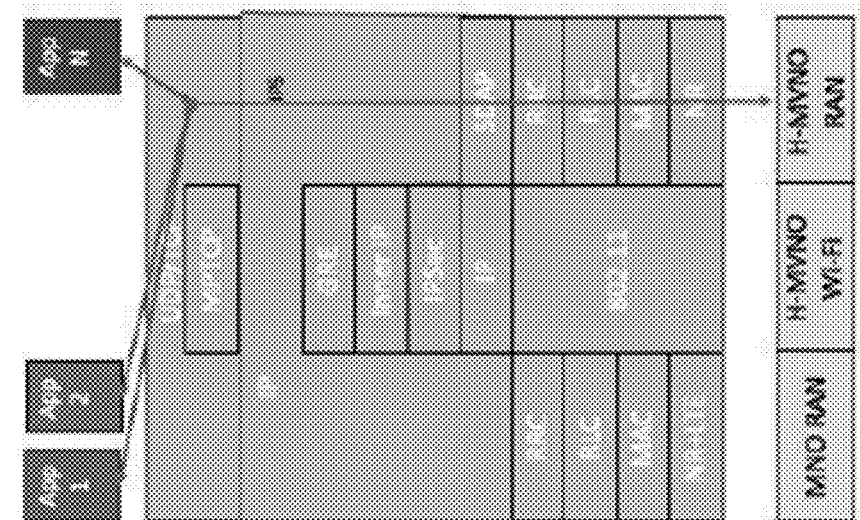
FIG. 19 illustrates a control plane protocol stack both outside of a H-MVNO coverage area and within a H-MVNO coverage area.
Figure 19:
Figure 19:
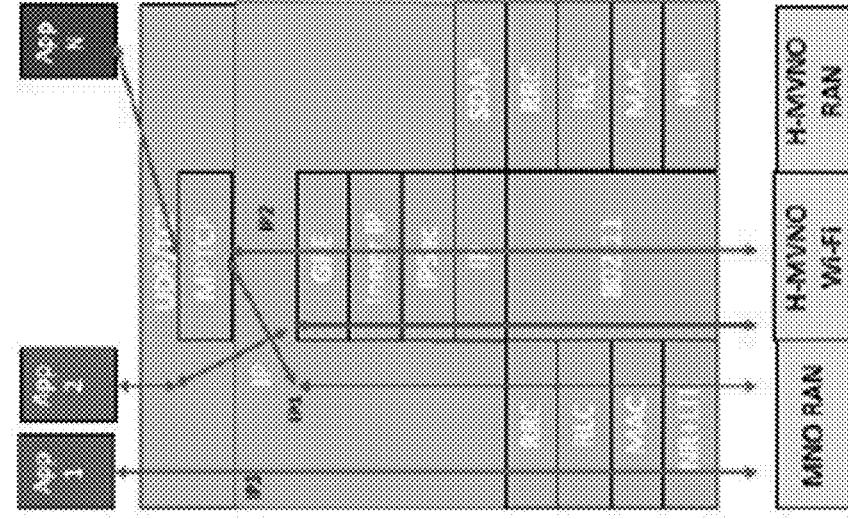

As shown in FIG. 19, this solution facilitates ATSSS between MNO 4G and H-MVNO Wi-Fi accesses only. To also facilitate ATSSS between H-MVNO's 5G and Wi-Fi accesses while in the coverage area of H-MVNO's 5G network, additional customization within the UE is required to facilitate switching of the Wi-Fi access leg between the MA PDU sessions established via MNO's 4G and H-MVNO's 5G.

Figure 20:
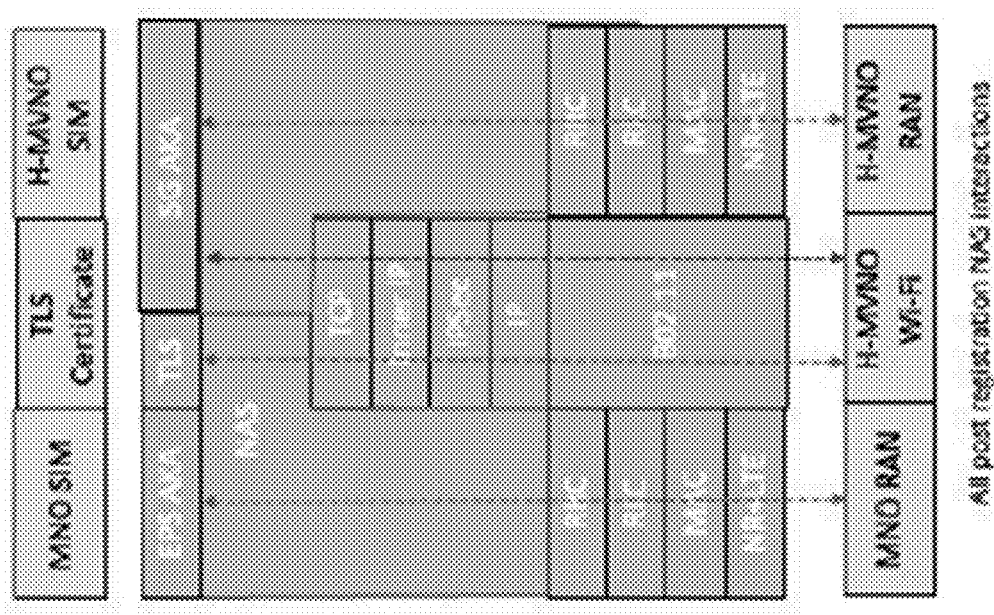
FIG. 20 illustrates a protocol stack to facilitate ATSSS via both of MNO and H-MVNO $3^{rd}$ Generation Partnership Project (3GPP) accesses.
Figure 20:
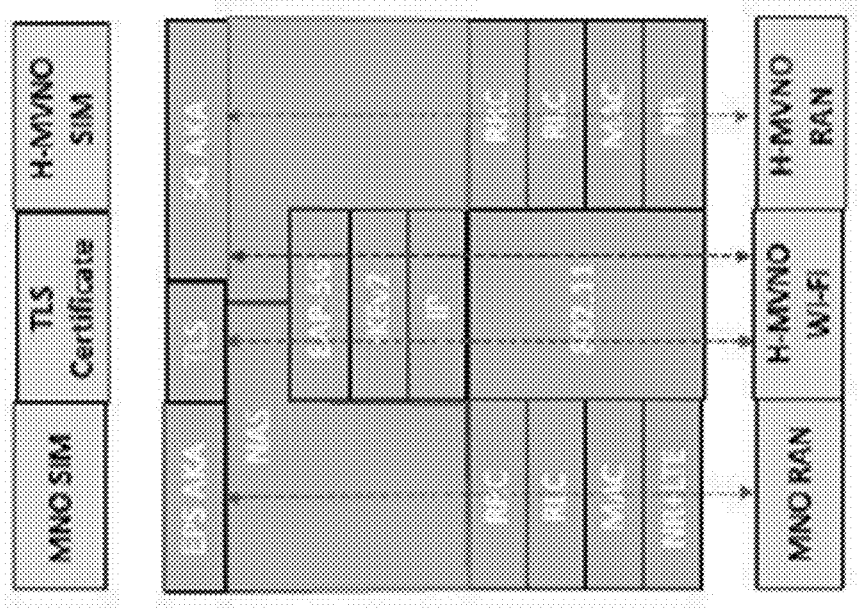

FIG. 20 depicts a control plane protocol stack required in the UE to support MA PDU sessions across both MNO and H-MVNO accesses. To enable support across both accesses, UE require enhancements that associate the Wi-Fi access leg with the MA PDU session established via the H-MVNO 5G access while in H-MVNO 5G coverage area. When outside of H-MVNO coverage, UE will have to associate the Wi-Fi access leg with the MA PDU session established via MNO's 4G access. To enable this dynamic association of the Wi-Fi access leg with MNO 4G and H-MVNO 5G networks, UE must be capable of dissociating and associating the PDU session established via Wi-Fi access as it moves across the coverage boundary between MNO's 4G and H-MVNO's 5G access networks.

Figure 21:
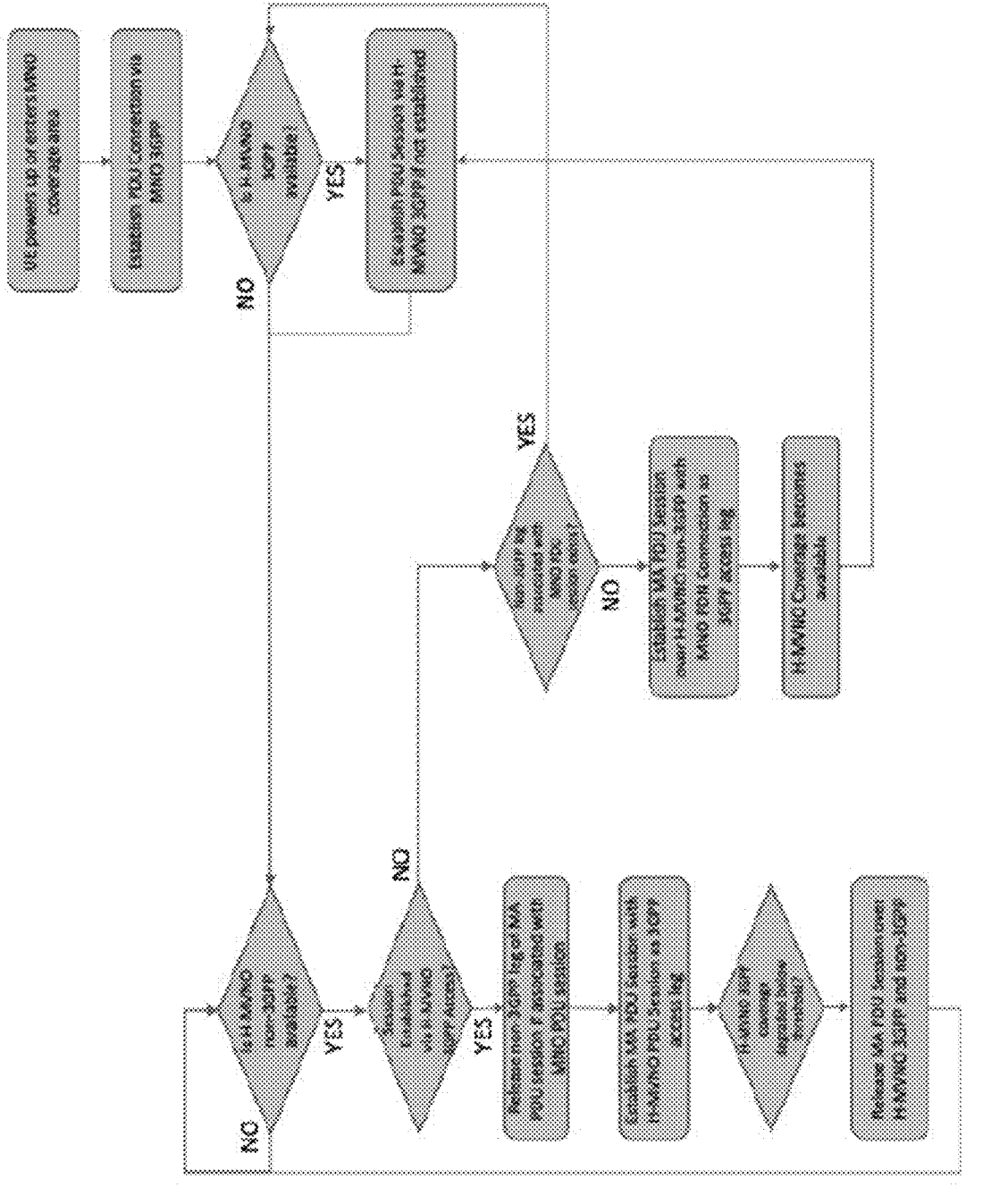
FIG. 21 illustrates a UE algorithm to switch a non-3GPP access leg of a MA PDU session across MNO and H-MVNO 3GPP accesses.

The UE will have to deregister and re-register with the H-MVNO Wi-Fi network depending on whether the H-MV-NO's 5G network is available. FIG. 21 depicts the algorithm to facilitate transfer of the Wi-Fi leg of the MA PDU session between MNO's 4G and H-MVNO's 5G.

Whenever the UE moves into the coverage area of H-MV-NO's 5G network, the UE will always register and establish the PDU session over H-MVNO's Wi-Fi access network using the PDU Session ID associated with that established via the H-MVNO 3GPP access network. If the UE had already registered and established a MA PDU session over H-MVNO Wi-Fi access using TLS credentials and PDU Session ID assigned to the PDN connections established via MNO's 4G network, it will deregister and re-register using H-MVNO SIM credentials. After successful registration, it will establish the MA PDU session using the PDU Session ID used for the H-MVNO 5G PDU session. Similarly, when the UE moves out of the coverage of H-MVNO's 5G access network, it will deregister from the H-MVNO Wi-Fi access and register using the TLS certificate if it is attached to MNO 4G network and has an established PDU connection. After the registration, it will then utilize the PDU Session ID associated with the PDN connection established via MNO 4G to establish the MA PDU session over H-MVNO's Wi-Fi network.

Additionally, to avoid ping-ponging in boundary region of MNO 4G and H-MVNO 5G coverage, the UE will need to build sufficient hysteresis in its switching algorithm. The amount of hysteresis required when moving into coverage of H-MVNO 5G access network could be different from that used when moving out of the coverage of H-MVNO 5G access network; UE implementation will need to support configuration of different hysteresis parameters for these two scenarios.

Depending on 5G core vendor implementation, customization may be required in the SMF to ensure that when UE requests release of a PDU session via the Wi-Fi access network, it does not release the MNO leg of the MA PDU session established via MNO's 4G access network. Moreover, if the UE performs a local release and does a re-establishment of the Wi-Fi leg (e.g. via MNO's 4G access network), the SMF must be capable of establishing the Wi-Fi leg as part of the PDU Session ID (e.g. MNO PDU Session ID) indicated in the PDU Session Establishment Request and locally deleting the Wi-Fi leg context (if present) from the PDU Session associated with the other PDU Session ID (e.g., H-MVNO's 5G PDU Session ID).

B. S6a, S8-C, and S8-U Interface Sharing

Figure 22:
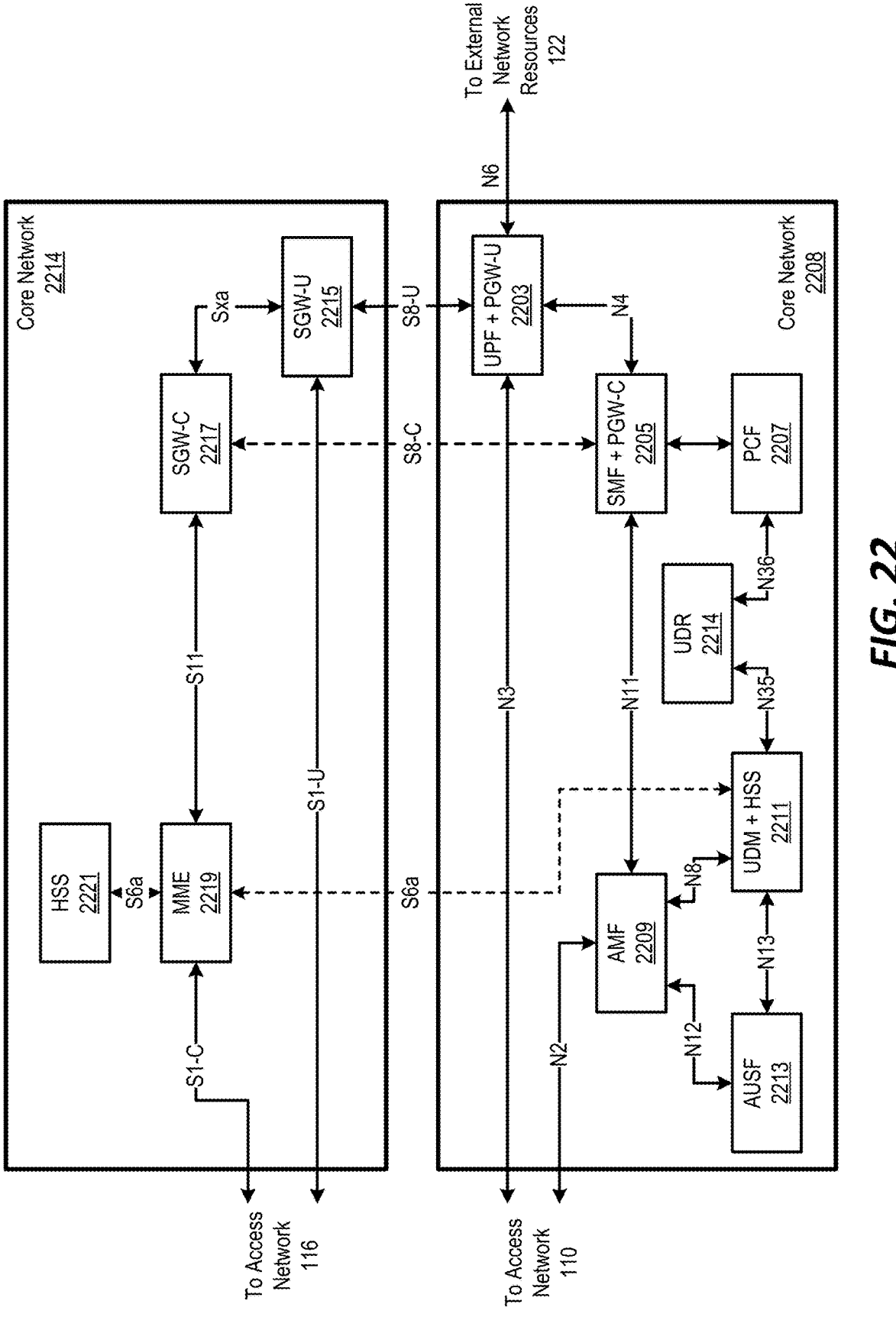
FIG. 22 is a block diagram illustrating yet another possible embodiment of core networks of the FIG. 1 communication system.

FIG. 22 illustrates an example of this architecture. In particular, FIG. 22 is a block diagram of a core network 2208 and a core network 2214, which are additional example embodiments of core networks 108 and 114, respectively. The two core networks in FIG. 22 have different respective architectures. In particular, core network 2208 is based on a 3GPP 5G mobile core network, while core network 2214 is based on 3GPP 4G mobile core network. Core network 2208 includes a UPF+PGW-U 2203, an SMF+PGW-C 2205, a PCF 2207, an AMF 2209, an UDM+HSS 2211, an AUSF 2213, and an UDR 2214. Core network 2214, on the other hand, includes an SGW-U 2215, an SGW-C 2217, an MME 2219, and an HSS 2221. UPF+PGW-U 2203 and SGW-U 2215 are linked by a 3GPP S8-U roaming interface, SMF+PGW-C 2205 and SGW-C 2217 are linked by a 3GPP S8-C roaming interface, and UDM+PGW-U 2211 and MME 2219 are linked by a 3GPPP S6a roaming interface. The S8-U, S8-C, and S6a interfaces collectively form an embodiment of interface 124 of FIG. 1.

This architecture enables standards-based ATSSS irrespective of whether the UE is located in the MNO or H-MVNO coverage area. With use of H-MVNO SIM for data sessions across both MNO and H-MVNO networks, MA PDU and non-3GPP credentials need to be enabled only for the H-MVNO SIM. As a result, this architecture eliminates the need to enable the MA PDU session between the MNO SIM and the H-MVNO SIM. The related customization required in the UE to facilitate ATSSS across the two SIM and associated networks in the above discussed S8-C and S8-U interface sharing is not required in the present architecture. The presented architectures can leverage standards based ATSSS feature. For this architecture, customization in the H-MVNO core network is also not necessary, since the H-MVNO UDM+HSS will be able to provide the anchor SMF+PGW-C information to the MNO MME, if the non-3GPP leg has been previously established, thereby ensuring a common packet session anchor when accessing MNO 3GPP and H-MVNO's non-3GPP networks. The only situation in which standards-based ATSSS functionality cannot be leveraged is when the H-MVNO UE is on an active voice call on MNO network. If ATSSS needs to be supported in such a scenario, additional custom functionality within the H-MVNO infrastructure and the H-MVNO UE is required.

Combinations of Features

Features described above may be combined in various ways without departing from the scope hereof. The following examples illustrate some possible combinations.

(A1) A method operable with a first communication network for supporting a user equipment (UE) device having at least a first identity associated with the first communication network and a second identity associated with a second communication network. The method includes the following: (1) exchanging data with the UE device via a first access communication link, the first access communication link being an access communication link of the first communication network, (2) exchanging data with the UE device via a second access communication link and an interface between the first and second communication networks, the second access communication link being an access communication link of the second communication network, and (3) performing access traffic steering, switching, and splitting (ATSSS) across at least the first and second communication links, at least partially using a proxy server associated with the first communication network.

(A2) In the method denoted as (A1), the first identity may be associated with a first Subscriber Identity Module (SIM) of the UE device, and the second identity may be associated with a second SIM of the UE device.

(A3) In the method denoted as (A1), the first identity may be associated with a security certificate, and the second identity may be associated with a SIM of the UE device.

(A4) In any one of the methods denoted as (A1) through (A3), the first identity may be associated with a first protocol stack of the UE device, and the second identity may be associated with a second protocol stack of the UE device.

(A5) In any one of the methods denoted as (A1) through (A4), the first identity may be associated with a first Internet Protocol (IP) address, and the second identity may be associated with a second IP address that is different from the first IP address.

(A6) In any one of the methods denoted as (A1) through (A5), the interface between the first and second communication networks may include one or more a $3^{rd}$ Generation Partnership Project (3GPP) S5 interface, a 3GPP S8 interface, a 3GPP N9 interface, and a 3GPP N16 interface.

(A7) In any one of the methods denoted as (A1) through (A6), the first access communication link may comply with a $3^{rd}$ Generation Partnership Project (3GPP) wireless communication protocol, and the second access communication link may comply with a 3GPP wireless communication protocol.

(A8) In any one of the methods denoted as (A1) through (A6), the first access communication link may comply with a 3GPP wireless communication protocol, and the second the second access communication link may comply with a non-3GPP wireless communication protocol.

(A9) In any one of the methods denoted as (A1) through (A6), the first access communication link may include one or more a Wi-Fi wireless communication link and a wireline communication link.

(A10) In any one of the methods denoted as (A1) through (A9), the first communication network may include a Packet Network Data Gateway (PGW) and a User Plane Function (UPF), and the proxy server may be integrated with the PGW and the UPF.

(A11) Any one of the methods denoted as (A1) through (A10) may further include exchanging data with the UE device via a third access communication link, where the third access communication link is an access communication link of the first communication network, and where performing ATSSS across at least the first and second communication links includes performing ATSSS across at least the first, second, and third access communication links.

(A12) The method denoted as (A11) may further include provisioning a secondary credential to the UE device, to enable the UE device to access the third access communication link via a protocol stack associated with the second identity.

(A13) Any one of the methods denoted as (A11) and (A12) may further include assigning a common anchor Session Management Function (SMF) and a common anchor User Plane Function (UPF) to a multi-access Packet Data Unit (PDU) session spanning at least the second and third access communication links.

(A14) Any one of the methods denoted as (A11) through (A13) may further include conducting a query using an International Mobile Equipment Identity (IMEI) as an alternative Subscription Permanent Identifier (SUPI), to obtain a SMF instance associated with the second identity.

(A15) Any one of the methods denoted as (A11) through (A13) may further include conducting a query at a selected Session Management Function SMF and a Control Plane Function of Packet Gateway (SMF+PGW-C) of the first communication network to determine the common anchor SMF, using a combination of (a) an identifier of the PDU Session and (b) an International Mobile Equipment Identity (IMEI) associated with the second identity as an alternative Subscription Permanent Identifier (SUPI).

(A16) In any one of the methods denoted as (A1) through (A15), performing ATSSS across at least the first and second communication links may include switching or steering data between at least the first and second access communication links in response to the UE device transitioning from one of the first and second communication networks to the other of the first and second communication networks.

(A17) In any one of the methods denoted as (A1) through (A16), performing ATSSS across at least the first and second communication links may include switching or steering data between at least the first and second access communication links at least partially based performance of one or more of the first and second access communication links.

(A18) In any one of the methods denoted as (A1) through (A17), performing ATSSS across at least the first and second communication links may include steering or switching data between at least the first and second access communication links as a function of one or more of (a) signaling exchange between the UE device and one or more of the first communication network and the second communication network, (b) type of data being exchanged between the UE device and the first communication network, (c) subscription information for a user of the UE device, (d) subscription information for the UE device, (e) policy associated with a user of the UE device, and (f) policy associated with the UE device.

(A19) Any one of the methods denoted as (A1) through (A18) may further include creating ATSSS policies and rules spanning the first identity and the second identity.

(A20) The method denoted as (A19) may further include enforcing the ATSSS polices and rules using a core network of the first network cooperating with an ATSSS client of the UE device.

(B1) A method operable with a first communication network for supporting a user equipment (UE) device having at least a first identity associated with the first communication network and a second identity associated with a second communication network. The method includes the following: (1) exchanging data with the UE device via a first access communication link, the first access communication link being an access communication link of the first communication network, (2) exchanging data with the UE device via a second access communication link and an interface between the first and second communication networks, the second access communication link being an access communication link of the second communication network, (3) determining that the first identity and the second identity are each associated with the UE device, and (4) assigning a common Internet Protocol IP address to the UE device for each of the first identity and the second identity.

(B2) In the method denoted as (B1), determining that the first identity and the second identity are each associated with the UE device may include determining that each of first identity and the second identity are associated with a common equipment identifier associated with the UE device.

(B3) In any one of the methods denoted as (B1) and (B2), the first identity may be associated with a first Subscriber Identity Module (SIM) of the UE device, and the second identity may be associated with a second SIM of the UE device.

(B4) In any one of the methods denoted as (B1) through (B3), the first identity may be associated with a first protocol stack of the UE device, and the second identity may be associated with a second protocol stack of the UE device.

(B5) Any one of the methods denoted as (B1) through (B4) may further include performing access traffic steering, switching, and splitting (ATSSS) across at least the first and second access communication links.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method operable with a first Third Generation Partnership Project (3GPP) communication network for supporting a user equipment (UE) device having at least a first identity associated with the first 3GPP communication network and a second identity associated with a second 3GPP communication network, the method comprising:
exchanging data with the UE device via a first access communication link, the first access communication link being an access communication link of the first 3GPP communication network;
exchanging data with the UE device via (i) a second access communication link and (ii) an interface between a core network of the first 3GPP communication network and a core network of the second 3GPP communication network, the second access communication link being an access communication link of the second 3GPP communication network; and
performing access traffic steering, switching, and splitting (ATSSS) across at least the first and second access communication links, at least partially using a proxy server associated with the first 3GPP communication network.

2. The method of claim 1, wherein:
the first identity is associated with a first Subscriber Identity Module (SIM) of the UE device; and
the second identity is associated with a second SIM of the UE device.

3. The method of claim 1, wherein:
the first identity is associated with a first protocol stack of the UE device; and
the second identity is associated with a second protocol stack of the UE device.

4. The method of claim 1, wherein:
the first identity is associated with a first Internet Protocol (IP) address; and
the second identity is associated with a second IP address that is different from the first IP address.

5. The method of claim 1, wherein the interface between the core network of the first 3GPP communication network and the core network of the second 3GPP communication network comprises one or more a 3GPP S5 interface, a 3GPP S8 interface, a 3GPP N9 interface, and a 3GPP N16 interface.

6. The method of claim 1, wherein:
the first access communication link complies with a 3GPP wireless communication protocol; and
the second access communication link complies with a 3GPP wireless communication protocol.

7. The method of claim 1, wherein:
the first 3GPP communication network comprises a Packet Network Data Gateway (PGW) and a User Plane Function (UPF); and
the proxy server is integrated with the PGW and the UPF.

8. The method of claim 1, further comprising:
exchanging data with the UE device via a third access communication link, the third access communication link being an access communication link of the first 3GPP communication network;
wherein performing ATSSS across at least the first and second access communication links comprises performing ATSSS across at least the first, second, and third access communication links.

9. The method of claim 8, further comprising provisioning a secondary credential to the UE device, to enable the UE device to access the third access communication link via a protocol stack associated with the second identity.

10. The method of claim 8, further comprising assigning a common anchor Session Management Function (SMF) and a common anchor User Plane Function (UPF) to a multi-access Packet Data Unit (PDU) session spanning at least the second and third access communication links.

11. The method of claim 8, further comprising conducting a query using an International Mobile Equipment Identity (IMEI) as an alternative Subscription Permanent Identifier (SUPI), to obtain a SMF-Session Management Function (SMF) instance associated with the second identity.

12. The method of claim 8, further comprising conducting a query at a selected Session Management Function (SMF) and a Control Plane Function of Packet Gateway (SMF+PGW-C) of the first 3GPP communication network to determine a common anchor SMF, using a combination of (a) an identifier of a Packet Data Unit (PDU) Session and (b) an International Mobile Equipment Identity (IMEI) associated with the second identity as an alternative Subscription Permanent Identifier (SUPI).

13. The method of claim 1, wherein performing ATSSS across at least the first and second access communication links comprises switching or steering data between at least the first and second access communication links in response to the UE device transitioning from one of the first and second 3GPP communication networks to the other of the first and second 3GPP communication networks.

14. The method of claim 1, wherein performing ATSSS across at least the first and second access communication links comprises switching or steering data between at least the first and second access communication links at least partially based performance of one or more of the first and second access communication links.

15. The method of claim 1, wherein performing ATSSS across at least the first and second access communication links comprises steering or switching data between at least the first and second access communication links as a function of one or more of (a) signaling exchange between the UE device and one or more of the first 3GPP communication network and the second 3GPP communication network, (b) type of data being exchanged between the UE device and the first 3GPP communication network, (c) subscription information for a user of the UE device, (d) subscription information for the UE device, (e) policy associated with a user of the UE device, and (f) policy associated with the UE device.

16. The method of claim 1, further comprising creating ATSSS policies and rules spanning the first identity and the second identity.

17. The method of claim 16, further comprising enforcing the ATSSS polices-policies and rules using the core network of the first 3GPP communication network cooperating with an ATSSS client of the UE device.

* * * * *